(12) United States Patent
Fuchigami

(10) Patent No.: US 6,393,463 B1
(45) Date of Patent: May 21, 2002

(54) ELECTRONIC MAIL COMMUNICATION APPARATUS, ELECTRONIC MAIL SYSTEM, AND ELECTRONIC MAIL COMMUNICATION METHOD

(75) Inventor: Koji Fuchigami, Niza (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/216,432

(22) Filed: Dec. 18, 1998

(30) Foreign Application Priority Data

Dec. 26, 1997 (JP) .............................................. 9-361402

(51) Int. Cl.⁷ .............................................. G06F 15/16
(52) U.S. Cl. ....................................... 709/206; 709/245
(58) Field of Search ................................. 709/206, 207, 709/245, 201; 379/93.01, 93.24

(56) References Cited

U.S. PATENT DOCUMENTS

| | | | | |
|---|---|---|---|---|
| 5,200,994 A | * | 4/1993 | Sasano et al. ............... | 379/142 |
| 5,263,082 A | * | 11/1993 | Kotake et al. ................ | 379/93 |
| 5,377,354 A | | 12/1994 | Scannell et al. ............ | 709/103 |
| 5,400,335 A | | 3/1995 | Yamada ....................... | 370/524 |
| 5,521,719 A | | 5/1996 | Yamada ....................... | 358/438 |
| 5,714,943 A | * | 2/1998 | Rasor ..................... | 340/825.44 |
| 6,029,068 A | * | 2/2000 | Takahashi et al. ........... | 455/426 |
| 6,097,797 A | * | 8/2000 | Oseto ..................... | 379/100.08 |

FOREIGN PATENT DOCUMENTS

| | | |
|---|---|---|
| WO | WO 95/12933 | 5/1995 |
| WO | WO 96/09714 | 3/1996 |

* cited by examiner

*Primary Examiner*—Mehmet B. Geckil
(74) *Attorney, Agent, or Firm*—Frishauf, Holtz, Goodman, Langer & Chick, P.C.

(57) ABSTRACT

The control section of a PDA incorporating a radio communication function adds respective subaddresses as identifiers to the mail address allocated to one account. The subaddresses classify the mail address as a plurality of destinations. The control section transmits an electronic mail to which one of the subaddresses is added to a mail server. The control section also discriminates the subaddress added as an identifier to an electronic mail by accessing a mailbox in the mail server, and receives the electronic mail to which the subaddress is added.

21 Claims, 14 Drawing Sheets

FIG.5

| DESTINATION USER NAME | TERMINAL TELEPHONE NUMBER | ADDRESS | MAIL ADDRESS (CORRESPONDING TO ACCOUNT) | SUBADDRESS | MEMO |
|---|---|---|---|---|---|
| △△△ | 050-000-0000 | TOKYO... | james@zzz.... | jjjj | AAA |
| □□□ | 050-111-1111 | TOKYO... | james@zzz.... | kkkk | BBB |
| ×× | 060-222-2222 | KYOTO... | janes@yyy.... | NONE | CCC |
| | | | | | |

FIG.11

| SUBADDRESS | TERMINAL TELEPHONE NUMBER | TERMINAL ABILITY |
|---|---|---|
| ×××× | 050-000-0000 | PDA |
| ○○○○ | 050-111-1111 | NOTE-PC |
| z z z z | PORT 1 | PC |

914a

SUBADDRESS ××××

MAIL DATA

SUBADDRESS ○○○○

MAIL DATA

⋮

COMMON AREA (NOT ADDED SUBADDRESS)

MAIL DATA

ELECTRONIC MAIL COMMUNICATION APPARATUS, ELECTRONIC MAIL SYSTEM, AND ELECTRONIC MAIL COMMUNICATION METHOD

BACKGROUND OF THE INVENTION

The present invention relates to an electronic mail communication apparatus, electronic mail system, and electronic mail communication method which use subaddresses that are added to a mail address corresponding to one account to classify the mail address into a plurality of destinations.

Recently, information communication networks using communication systems such as the Internet, personal computer LANS, and personal computer communications have been greatly spread in offices, homes, and the like.

An electronic mail application as one of the typical network applications can connect different types of communication systems, e.g., the Internet and a personal computer LAN, as well as the same type of communication systems, and hence is used as an indispensable communication means.

At present, a portable terminal such as a notebook personal computer or PDA (Personal Digital Assistant) can transmit/receive electronic mail on the move by a PHS (Personal Handyphone System: second-generation cordless phone system) capable of digital transmission at 32 kbps or a digital portable telephone set that can receive a packet communication service.

For example, an electronic mail system using the internet will be described. An electronic mail sender accesses the mail server at the transmitting end through a public telephone network or the like to search for a mail server at the receiving end (destination) in accordance with a predetermined program. The electronic mail is stored in the receiver's mail box in the mail server at the receiving end. The receiver reads out the electronic mail addressed to him/her and transmits a reply electronic mail.

In such electronic mail transmission/reception, one mail address conforming to the rule "ID (user's name or the like)"@ "organization to which the user belongs" "country name" is generally allocated to one account. The user at the transmitting end designates the mail address of the transmission destination as a destination, and transmits electronic mail to the mail server in which the mail address of the transmission destination is registered. The user at the receiving end reads out the electronic mail addressed to him/her from the his/her mail box in the mail server.

In the above situation, a plurality of users may want to use one account. In this case, the following problems are posed.

First, when, for example, all the members of a family use one mail address allocated to one account, all the members can access every electronic mail regardless of any user of the family to which the electronic mail is transmitted. Therefore, the privacy of each member of the family cannot be protected.

Second, since the privacy cannot be protected for the above reason, a sender who wants to transmit electronic mail to a specific individual cannot transmit the electronic mail in a casual manner because the electronic mail may be read by users other than the one whom the sender wants to transmit the mail.

Third, when a user receives an electronic mail addressed to him/her, he/she simultaneously receives electronic mail addressed to other users allocated to the same account. For this reason, a longer period of time than is necessary is required for connection to a provider or the like, resulting in an increase in communication expense.

Fourth, in some case, a user may receive an electronic mail addressed to another user allocated to the same account even if there is no mail addressed to him/her, resulting in waste in various points, e.g., communication expenses, time, and the power consumed by a communication terminal.

If, however, all the members of the family respectively acquire accounts, the charge corresponding to the number of accounts is required, resulting in an increase in expense.

Furthermore, when a user is to individually use this system, he/she may want to use electronic mail in different ways in accordance with the contents. In this case as well, the user must acquire accounts equal in number to the number of ways in which electronic mail is used.

BRIEF SUMMARY OF THE INVENTION

The present invention has been made in consideration of the above situation, and has as its object to provide an electronic mail communication apparatus, electronic mail system, electronic mail communication method, and electronic mail transmission method which can send electronic mail to a plurality of destinations, as needed, by adding respective subaddresses to the mail address allocated to one account. The present invention has the following characteristics.

(1) According to the present invention, there is provided an electronic mail communication apparatus comprising subaddress adding means for adding a subaddress to a mail address, the subaddress classifying the mail address into one of a plurality of destinations, and transmission means for transmitting electronic mail to which the subaddress is added by the subaddress adding means.

An electronic mail communication apparatus preferably comprises subaddress designating means for designating a subaddress which is added to a mail address to classify the mail address into a plurality of destinations, and reception means for receiving. electronic mail to which the subaddress designated by the subaddress designating means is added.

According to this configuration, the electronic mail communication apparatus at the transmitting end can transmit electronic mail to the mail server after adding a subaddress to the mail address of the electronic mail by using the subaddress adding means. The electronic mail communication apparatus at the receiving end designates a subaddress by using the subaddress designating means, and receives the electronic mail to which the designated subaddress is added from the mail server. This allows electronic mail communication using mail addresses to which subaddresses are respectively added.

A user cannot therefore access any electronic mail addressed to others, and hence privacy can be protected unlike the conventional case in which all the members allocated to the same account can access every electronic mail.

In addition, since electronic mail can be addressed to a specific user by using a subaddress, the user at the receiving end can read out only the electronic mail addressed to him/her without accessing electronic mail addressed to others. This can shorten the communication time, and savings in time, communication expense, and charge for electricity can be expected.

It is preferable that the electronic mail communication apparatus further comprise reception means for receiving electronic mail to which no subaddress is added.

According to this configuration, when electronic mail to which the subaddress designated by the subaddress designating means is to be received, not only this electronic mail but also electronic mail having a mail address which corresponds to the account but has no subaddress can be received.

Preferably, the electronic mail communication apparatus further comprises reception condition storage means for storing reception conditions corresponding to subaddress, and in which the reception means selectively receives an electronic mail based on the reception condition corresponding to the subaddress added to the mail address.

In addition, there is provided an electronic mail communication apparatus comprising reception condition storage means for storing reception conditions corresponding to subaddresses, the subaddresses being added to a mail address to classify a mail address into a plurality of destinations, and reception means for selectively receiving an electronic mail based on the reception condition corresponding to the subaddress added to the mail address. In this case, it is preferable that the reception means receives an electronic mail to which no subaddress is added.

According to this configuration, since the reception conditions are stored in the storage unit, only electronic mail to which a subaddress corresponding to the reception conditions are added can be received. This can impose restrictions on electronic mail that can be received in accordance with situations.

There is also provided an electronic mail communication apparatus comprising reception means for receiving an electronic mail, terminal information storage means for storing terminal information which makes communication terminals correspond to a subaddress which is added to a mail address to classify the mail address into a plurality of destinations, and notification means for specifying a communication terminal corresponding to the subaddress added to electronic mail received by the reception means on the basis of the terminal information, and informing the specified communication terminal, of the reception of the electronic mail addressed to the specified communication terminal.

According to this configuration, the communication terminal corresponding to the subaddress added to the electronic mail received by the reception means can be specified on the basis of the terminal information, and the electronic mail to which the subaddress is added can be transmitted to the specified communication terminal. By registering the terminal information, therefore, electronic mail can be received regardless of whether the terminal is located indoors or outdoors.

(2) According to the present invention, there is provided an electronic mail communication system comprising a base station and electronic mail communication apparatuses in which, the base station comprising, reception means for receiving an electronic mail, storage means for storing the correspondence of subaddress classifying the mail address into a plurality of destinations and the electronic mail communication apparatuses and transmission means for transmitting the electronic mail to one of the mail communication apparatuses corresponding to the subaddress added to the electronic mail received by the reception means on the basis of the correspondence stored in the storage means.

According to this configuration, since a mail address to which a subaddress is added is set, a user can receive only electronic mail addressed to him/her without acquiring any individual account. This shortens the communication time, and savings in time, communication expense, and charge for electricity can be expected.

It is preferable that the electronic mail communication system comprises a mail server for managing electronic mail in units of mail addresses allocated to accounts, and an electronic mail communication apparatus communicated with the mail server, the mail server comprising in which reception means for receiving electronic mails having an address and a subaddress classifying a mail address into a plurality of destinations and storage means for storing the electronic mail received by the reception means in units of the subaddress.

According to this configuration, in the mail server, the reception means receives electronic mails having an address and a subaddress, and each of electronic mails is stored in the storage means in units of subaddress, thereby allowing electronic mail management based on the subaddress.

In the electronic mail communication system, the mail server comprises storage means for storing terminal information which makes the respective subaddress correspond to other communication terminals and transmission means for transmitting the electronic mail to one of the mail communication terminals corresponding to the subaddress added to the electronic mail received the reception means on the basis of the terminal information stored in the storage means.

According to this configuration, the mail server transmits the electronic mail to the mail communication terminal corresponding to the subaddress added to the electronic mail on the basis of the terminal information stored in the storage means. By storing the terminal information, therefore, electronic mail can be received regardless of whether the terminal is located indoors or outdoors.

According to the present invention, there is provided an electronic mail communication system comprising a mail server for managing electronic mail in units of mail addresses allocated to accounts, and an electronic mail communication apparatus, wherein the electronic mail communication apparatus comprises subaddress adding means for adding the first subaddress to a mail address, the subaddress classifying the mail address into a plurality of destinations, transmission means of transmitting an electronic mail to which the first subaddress is added by the subaddress adding means, reception means for receiving an electronic mail having a mail address to which a predetermined subaddress is added, the mail server comprises reception means for receiving electronic mail having a mail address to which the second subaddress is added, and storage means for storing the electronic mail received by the reception means in units of the second subaddress.

According to this configuration, the electronic mail communication apparatus causes the subaddress adding means to add the first subaddress to a mail address, and the mail server causes the reception means to receive a electronic mail having a mail address to which a predetermined subaddress is added. The mail server causes the reception means to receive the electronic mail having a mail address to which the second subaddress is added, and the mail server causes the storage means to storage the electronic mail received by the reception means in unit of the second subaddress.

Electronic mail communication can therefore be performed by using mail addresses to which subaddresses are respectively added. This allows individual management of electronic mail without individually acquiring an account.

When, therefore, a plurality of users are to use one account, a user cannot access any electronic mail addressed to others, and hence privacy can be protected unlike the conventional case in which all the members can access every electronic mail.

In addition, since electronic mail can be addressed to a specific user by using a subaddress, the user at the receiving end can read out only the electronic mail addressed to him/her without accessing electronic mail addressed to others. This can shorten the communication time, and savings in time, communication expense, and charge for electricity can be expected.

(3) According to the present invention, there is provided an electronic mail communication system which includes a mail server for managing electronic which includes a mail server for managing electronic mail in units of mail addresses allocated to accounts and in which a plurality of communication terminals are connected to the mail server, wherein the mail server comprises reception means for receiving an electronic mail having an address and a subaddress classifying a mail address into a plurality of destinations and storage means for storing the electronic mail received by the reception means in units of subaddress.

According to this configuration, the mail server causes the reception means to receive the electronic mail having an address and a subaddress, and stores the electronic mail in the storage means in units of subaddress. This allows electronic mail management using subaddress.

In the electronic mail communication system, the mail server preferably comprises storage means for storing terminal information which makes the respective subaddress correspond to other communication terminals and transmission means for transmitting the electronic mail to one of the mail communication terminals corresponding to the subaddress added to the electronic mail received the reception means on the basis of the terminal information stored in the storage means.

According to this configuration, the mail server transmits the electronic mail to the communication terminal corresponding to the subaddress added to the electronic mail received by the reception means on the basis of the terminal information stored in the storage means. By storing the terminal information, therefore, electronic mail can be received regardless of whether the terminal is located indoors or outdoors.

(4) According to the present invention, there is provided an electronic mail communication apparatus which transits/receives data to/from a base station including position registration means, comprising storage means for storing positional conditions for reception of an electronic mail and subaddress classifying a mail address into a plurality of destinations in correspondence with each other and reception means for collating the positional conditions with position information of the electronic mail communication apparatus which is received from the position registration means of the base station, and receiving electronic mail to which a subaddress corresponding to a reception condition that allows reception of the electronic mail is added.

According to this configuration, the position information received from the base station is collated with each reception condition input by the user in advance and stored in the storage means to discriminate a subaddress corresponding to the condition that allows reception, and the electronic mail to which the subaddress is added is received by the reception means. By setting reception conditions, therefore, the reception of electronic mail can be controlled in accordance with the conditions.

This allows a user to perform reception control in accordance with places or the like. For example, the user can selectively receive business electronic mail and private electronic mail.

(5) According to the present invention, there is provided an electronic mail communication method in an electronic mail system, comprising transmitting an electronic mail after adding each of respective subaddresses to the electronic mail, the subaddresses classifying the mail address as a plurality of destinations.

According to this configuration, electronic mail communication can be performed by using mail addresses to which subaddresses are respectively added. This allows individual management of electronic mail without individually acquiring an account.

When, therefore, a plurality of users are to use one account, a given user cannot access any electronic mail addressed to others, and hence privacy can be protected unlike the conventional case in which all the members can access every electronic mail.

In addition, since electronic mail can be addressed to a specific user by using a subaddress, the user at the receiving end can read out only the electronic mail addressed to him/her without accessing electronic mail addressed to others. This can shorten the communication time, and savings in time, communication expense, and charge for electricity can be expected.

When a given user is to privately use one account, he/she can use one mail address classified as a plurality of addresses by using subaddress. This allows electronic mail management in accordance with application purposes.

In addition, according to the present invention, there is provided an electronic mail communication method in an electronic mail system, comprising receiving an electronic mail to which a mail address corresponding to an account is added, and an electronic mail to which a subaddress is added, the subaddress classifying the mail address as a plurality of destinations.

According to this configuration, not only electronic mail having a subaddress and addressed to a given user but also electronic mail having a mail address corresponding to the common account are received. When, therefore, a plurality of users are to use one account, each user can receive private electronic mail and electronic mail addressed to all the users.

Furthermore, electronic mail can be transmitted to all the users by only adding the mail address corresponding to the account to the electronic mail. This can save the trouble of transmitting electronic mail to each user.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description,of the preferred embodiments given below, serve to explain the principles of the present invention in which:

FIG. 5 shows an example of the mail address book stored in the storage medium 68 of FIG. 4.

FIG. 11 shows an example of the local mail box 914a stored in the storage medium 914 of FIG. 10.

DETAILED DESCRIPTION OF THE INVENTION

The first to third embodiments of the present invention will be described below with reference to the accompanying drawings.

(First Embodiment)

Figure 1:
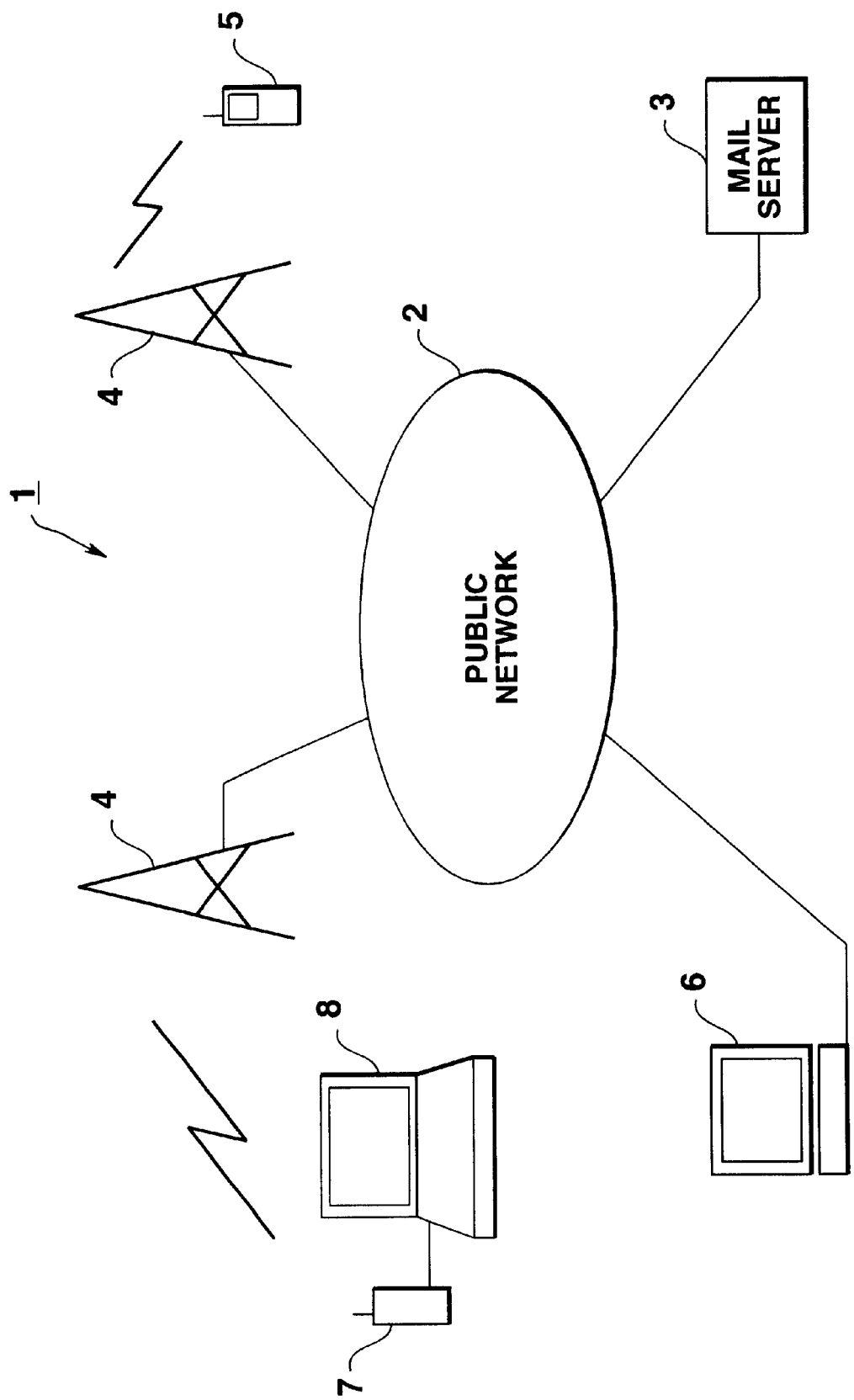
FIG. 1 shows the schematic configuration of an electronic mail communication system 1 according to the first embodiment.

The schematic configuration of an electronic mail communication system will be described first with reference to FIG. 1. FIG. 1 shows the schematic configuration of an electronic mail communication system 1 according to the first embodiment.

Referring to FIG. 1, in the electronic mail communication system 1, a radio telephone set (e.g., PHS or cellular phone) 7 connected to a PDA 5 incorporating a radio communication function (e.g., PHS or, cellular phone) or notebook PC 8 is accessing, through a radio base station 4, a mail server 3 connected to a public network 2. A personal computer 6 can access the mail server 3 through a communication line such as a telephone line, ISDN (Integrated Services Digital Network) line, or leased line.

Referring to FIG. 1, of the various servers prepared in a provider, a personal computer communication company, or the like, the mail server 3 is a computer conforming to the electronic mail transfer protocol SMTP (Simple Mail Transfer Protocol) (an electronic mail protocol to be used under a TCP/IP environment) or the like. The mail server 3 is connected to the public network 2 through a router (not shown), and serves to manage electronic mail in units of mail addresses assigned to the respective accounts. More specifically, the mail server 3 transmits electronic mail to the address of a predetermined user, receives electronic mail addressed to a registered user, and stores it in a predetermined memory area.

Figure 2:
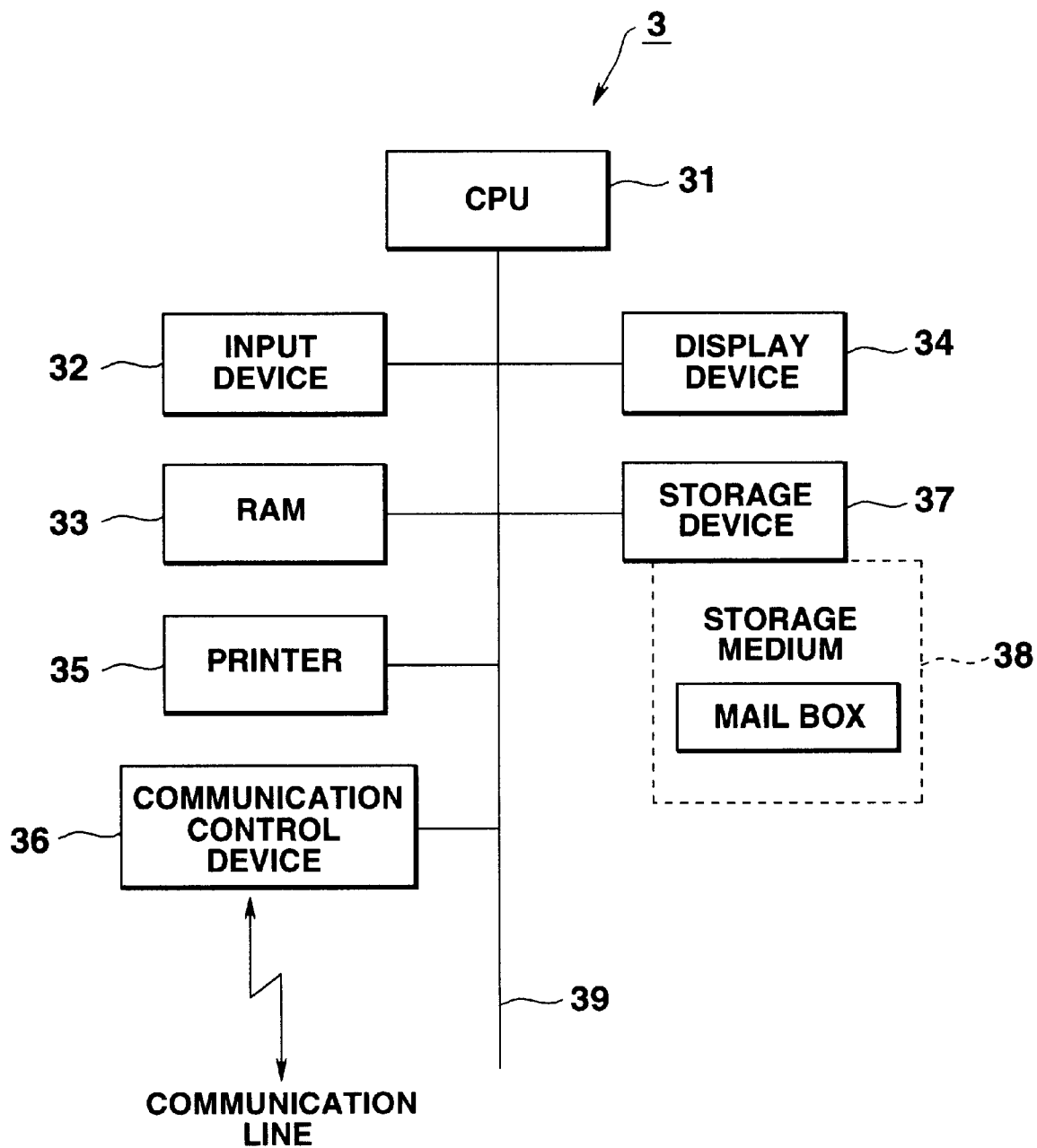
FIG. 2 is a circuit block diagram of the mail server 3 of FIG. 1.

FIG. 2 is a block diagram showing the schematic configuration of the mail server 3.

Referring to FIG. 2, the mail server 3 is comprised of a CPU 31, an input unit 32, a RAM 33, a display unit 34, a printer 35, a communication control section 36, a storage unit 37, and a storage medium 38. The respective components except for the storage medium 38 are connected to each other through a bus 39.

The CPU (Central Processing Unit) 31 reads out an electronic mail management application program from the storage medium 38 in the storage unit 37, stores it in the work memory area in the RAM 33, and executes various types of electronic mail management processes in accordance with the electronic mail management application program stored in the RAM 33. Each of these electronic mail management processes is performed in units of mail addresses assigned to the respective accounts. The process result is stored in the work memory in the RAM 33 and displayed on the display unit 34. The process result stored in the work memory is stored in a corresponding memory area in the storage medium 38 in the storage unit 37.

The CPU 31 stores the electronic mail received from another mail server in a mail memory area (referred to a mailbox) corresponding to the mail address in accordance with the electronic mail management application program.

Identifiers are defined for classifying a mail address into a plurality of destinations as subaddresses and a plurality of memory areas corresponding to the subaddresses in the mailbox corresponding to the mail address as submailboxes.

As will be described later, when a subaddress is added to the mail address of the received electronic mail, the CPU 31 discriminate the subaddress to store the received electronic mail in the submailbox.

Alternatively, this system may have mailboxes prepared in units of subaddress instead of dividing the mailbox corresponding to a given mail address into submailboxes corresponding to the respective subaddresses. In this case, the login user can access only the mailbox corresponding to his/her subaddress and the mailbox corresponding to his/her mail address having no subaddress, but cannot access other mailboxes.

In addition, when a user terminal performs electronic mail receiving process through the communication line, the CPU 31 transmits the electronic mail to which the subaddress of the login user terminal is added or the electronic mail having no subaddress.

The input unit 32 includes a keyboard having cursor keys, numeric keys, various function keys, and the like and a mouse as a pointing device. The input unit 32 outputs the depression signal obtained by depressing a key of the keyboard to the CPU 31, and also outputs the operation signal obtained by operating the mouse to the CPU 31.

The RAM (Random Access Memory) 33 has a work memory area for storing the above electronic mail management application program, input instructions, input data, process results, and the like.

The display unit 34 is a CRT (Cathode Ray Tube), a liquid crystal display unit, or the like, and displays the display data input from the CPU 31.

The printer 35 prints, for example, the data created by the electronic mail management application program corresponding to the mail server 3.

The communication control section 36 is constituted by a modem (MODEM: Modulator/DEModulator), a terminal adapter (TA), a router, and the like, and performs control to communicate with an external device through a communication line such as a telephone line, ISDN line, or leased line. The modem is a modulator/demodulator for modulating the digital data processed by the CPU 31 into an analog signal in the frequency band of the telephone line so as to communicate with an external device such as the personal computer 6 through the telephone line, and demodulating the analog signal input through the telephone line into a digital signal. The terminal adapter is a device for converting an existing interface into an I interface corresponding to an ISDN to allow communication with an external device such as the personal computer 6 through the ISDN line. When the personal computer 6 connected to the router through the leased line is a component of a LAN (Local Area Network), the router serves as a device for connecting the LAN on the provider side including the mail server 3 to the LAN including the personal computer 6.

The storage unit 37 has the storage medium 38 in which programs, data, and the like are stored in advance. In general, this storage medium 38 is a magnetic recording medium called a hard disk allowing high-speed access as compared with other types of storage media. The storage medium 38 is used to store the electronic mail management application program corresponding to the mail server 3, the data processed by this program, and the like.

The electronic mail management application stored in the storage medium 38 in the storage unit 37 is a server application for managing transmission/reception of electronic mail by performing communication with communication terminals such as the PDA 5 incorporating the PHS communication function and connected through the public network 2 or the radio base station 4, the PHS terminal 7 connected to the notebook PC 8, and the personal computer 6.

Mailboxes corresponding to the mail addresses of the respective users are set in the storage medium 38. The electronic mail received from another mail server is stored in the mailbox corresponding to the mail address as the destination of the mail.

Each mailbox set in the storage medium 38 is divided into submailboxes in correspondence with subaddress classifying a mail address into a plurality of destinations. In this case, in each submailbox, the electronic mail having the corresponding subaddress added thereto and received as a destination from another mail server is stored. An access right is set in advance for the above mailbox or submailbox. For example, a login name and a password are set in advance in correspondence with each address and subaddress. Only the user who is discriminated as a user having an access right on the basis of the login name and password input by the user in accessing the mail server 3 can access the electronic mail having the subaddress or the submailbox.

Of the above components, devices such as the input unit 32, the display unit 34, the printer 35, and the terminal adapter, router, or the like as the communication control section 36 may not be dedicated to the mail server 3 and may be shared among various servers prepared in providers.

Figure 3:
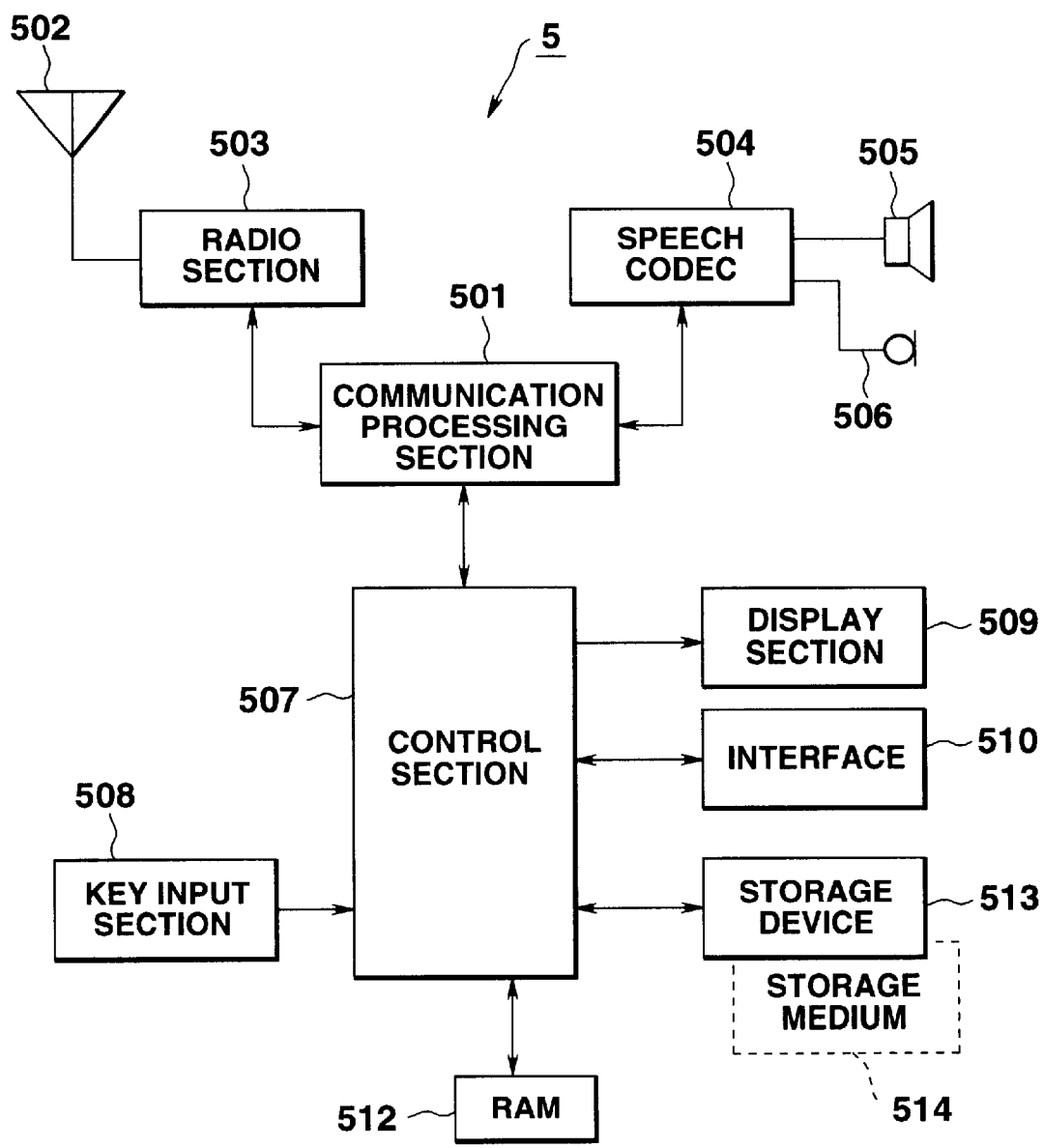
FIG. 3 is a circuit block diagram of the PDA 5 incorporating the communication function of FIG. 1.

FIG. 3 is a block diagram showing the configuration of the PDA 5 incorporating the communication function in FIG. 1. Referring to FIG. 3, the PDA 5 is comprised of a communication processing section 501, an antenna 502, a radio section 503, a speech conversion circuit 504, a loudspeaker 505, a microphone 506, a control section 507, a key input section 508, a display section 509, an interface 510, a RAM 512, a storage unit 513, and a storage medium 514.

The communication processing section 501 converts the compressed speech signal input from the speech conversion circuit 504 or the compressed coded communication data input from the control section 507 into a signal conforming to a predetermined radio communication scheme, and outputs it to the radio section 503. The communication processing section 501 demodulates the reception signal input from the radio section 503, converts the signal into digital data that can be read by the control section 507, and outputs the data to the control section 507. Alternatively, the communication processing section 501 converts the signal into a compressed speech signal and outputs it to the speech conversion circuit 504.

The antenna 502 transmits/receives radio transmission signals/radio reception signals in a predetermined frequency range between the radio base stations 4.

The radio section 503 is constituted by an RF modulation circuit and the like. The radio section 503 modulates the signal input from the communication processing section 501 in accordance with a predetermined modulation scheme, converts it into a radio transmission signal in a predetermined frequency band, and outputs the signal to the antenna 502. The radio section 503 also demodulates the radio reception signal in a predetermined frequency band which is input from through the antenna 502, and outputs the resultant signal to the communication processing section 501.

The speech conversion circuit speech codec 504 compression-codes the speech input through the microphone 506, and outputs the resultant signal to the communication processing section 501. The speech conversion circuit 504 decodes the compressed speech signal input from the communication processing section 501, converts it into an analog signal, and outputs it to the loudspeaker 505.

The loudspeaker 505 outputs the analog speech signal input from the speech conversion circuit 504 as an audible sound. The microphone 506 senses user's speech and converts it into an analog speech signal, and outputs it to the speech conversion circuit 504.

The control section 507 stores the designated application program of various application programs corresponding to the PDA 5 incorporating the PHS communication function and stored in the storage medium 514 in the storage unit 513 and various instructions or data input through the key input section 508 in the work memory area in the RAM 512, and executes various processes in accordance with the input instructions and input data and the application program stored in the RAM 512. The control section 507 stores the process result in the work memory area in the RAM 512, and displays it on the display section 509. The control section 507 also stores the process result, stored in the work memory area, in the predetermined memory area in the storage medium 514 in the storage unit 513 which is designated by the input from the key input section 508.

In addition, the control section 507 executes the electronic mail application stored in the storage medium 514 in the storage unit 513 to perform electronic mail transmission processing (see FIG. 6) to be described later. Upon determining that a subaddress is designated in transmission, the control section 507 adds the subaddress as an identifier to the mail address of the destination.

Similarly, in electronic mail reception processing (see FIG. 7) to be described later, the control section 507 accesses a given mailbox set in the storage medium 38 in the storage unit 37 of the mail server 3 according to a POP command. If there is new electronic mail received by the mail server 3, the control section 507 discriminates the subaddress by referring to the header of the electronic mail, and receives the electronic mail having the mail address corresponding to the account or the subaddress for the receiver from the mail server 3.

The key input section 508 has various keys such as a power key, an off-hook key, an on-hook key, a ten-key pad, and a playback key, and outputs various operation keys corresponding to key input operations to the control section 507. The display section 509 is constituted by a liquid crystal panel and the like, and displays the display data input or designated by the control section 507. Note that a touch panel as an input section may be prepared on the surface of the display section 509.

The interface 510 is comprised of an RS-232C terminal, an IrDA port, a PC card slot, and the like. The PDA 5 can be connected to another portable terminal, a desktop personal computer, or the like through the interface 510.

The RAM 512 forms a work memory area in which various data to be processed are temporarily stored when various control processes are executed by the control section 507.

The storage medium 514 is permanently or detachably mounted in the storage unit 513. The storage medium 514 is a magnetic or optical recording medium or semiconductor memory. This storage medium 514 stores various control programs to be executed by the control section 507 to control the respective components of the PDA 5 incorporating the PHS communication function. These control programs are stored in the form of program codes that can be read by the control section 507. The storage medium 514 also stores various application programs corresponding to the PDA 5 incorporating the PHS communication function, the data processed by the respective processing programs, and the like. Data can be exchanged by mounting this storage medium 514 on a desktop personal computer, another portable terminal, and the like.

The application programs stored in the storage medium 514 include an electronic mail application. This electronic mail application is used to transmit/receive electronic mail by performing communication with the mail server 3 connected through a communication line according to an electronic mail protocol such as SMTP or POP (Post Office Protocol) (both of which are electronic mail protocols to be used under the TCP/IP environment). This electronic mail application has various functions of assisting the electronic mail transmitting/receiving operation of the user. For example, the application serves to perform management (edition, display, storage, deletion, and the like) of transmission/reception electronic mail files, management of a mail address book, setting of a transmission/reception schedule, encryption, decryption, and the like.

The mail address book created by the electronic mail application is stored in the storage medium 514. In this mail address book, mail addresses, user names, user telephone numbers, addresses, and memos, and the like are registered in correspondence with each other.

Assume that each of subaddress for classifying a mail address corresponding to one account into a plurality of destinations is added to the mail address to allow a plurality of users to use the same mail address account. In this case, a plurality of sets of mail addresses, user names, user telephone numbers, addresses, memos, subaddress designated for the respective users, mail addresses corresponding to accounts and the like are registered in the mail address book.

Figure 4:
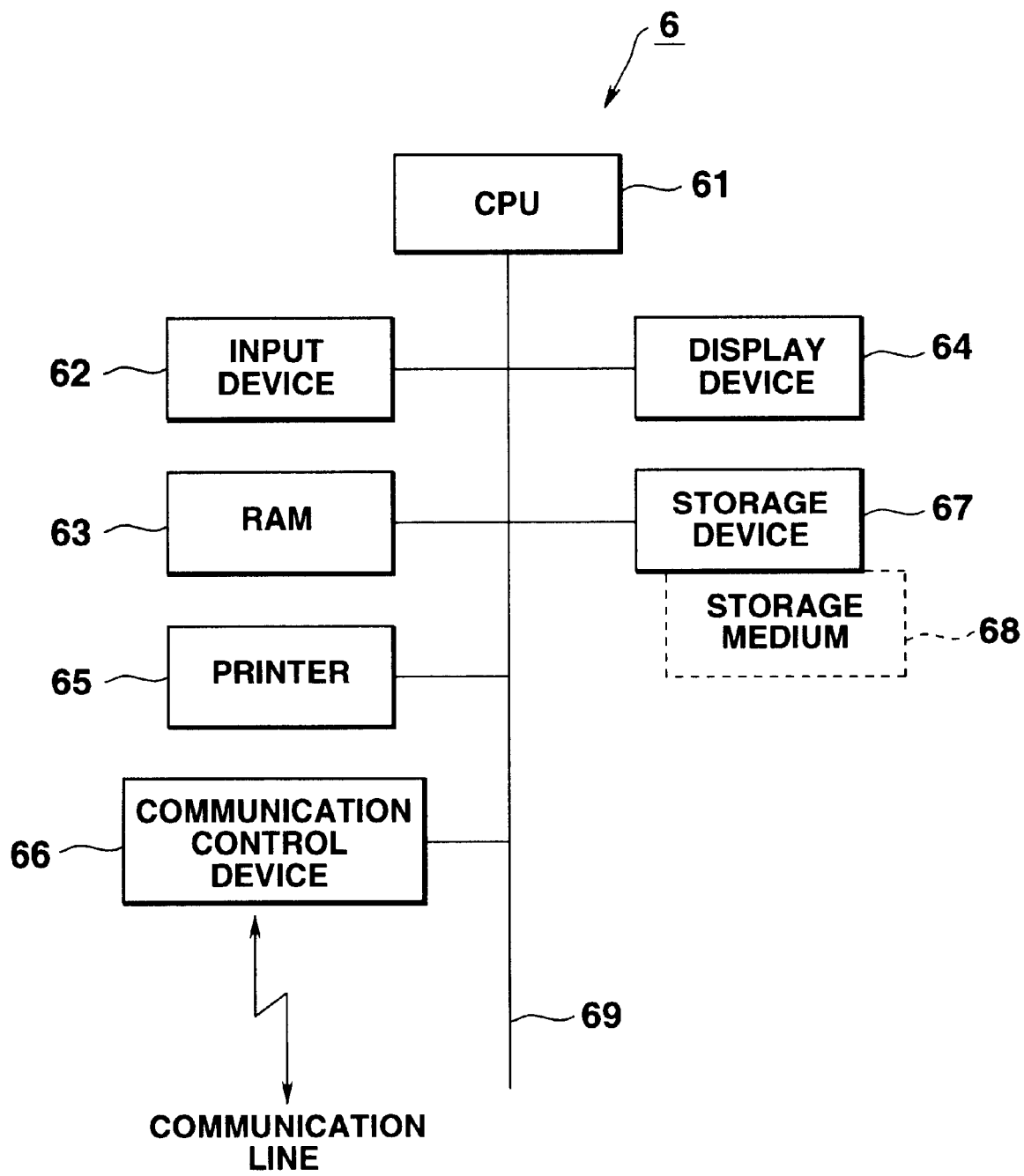
FIG. 4 is a circuit block diagram of the personal computer 6 of FIG. 1.

FIG. 4 is a block diagram showing the configuration of the personal computer 6. Referring to FIG. 4, the personal computer 6 is constituted by a CPU 61, an input unit 62, a RAM 63, a display unit 64, a printer 65, a communication control section 66, a storage unit 67, and a storage medium 68. The respective components except for the storage medium 68 are connected to each other through a bus 69.

The CPU 61 stores the designated application program of the various application programs corresponding to the personal computer 6 and stored in the storage unit 67 and the various instructions and data input through the input unit 62 in the work memory area in the RAM 63, and executes various processes in accordance with the input instructions, the input data, and the application program stored in the RAM 63. The CPU 61 stores the process result in the work memory area in the RAM 63, and displays it on the display unit 64. The CPU 61 then stores the process result, stored in the work memory area, in the location in the storage medium 68 in the storage unit 67 which is designated by the input from the input unit 62.

In addition, similar to the control section 507 of the PDA 5 incorporating the communication function in FIG. 3, the CPU 61 executes the electronic mail application stored in the storage medium 68 in the storage unit 67 to execute electronic mail transmission processing (see FIG. 6) and electronic mail reception processing (see FIG. 7) (to be described later).

The input unit 62 includes a keyboard having cursor keys, numeric keys, various function keys, and the like and a mouse as a pointing device. The input unit 62 outputs the depression signal obtained by depressing a key of the keyboard to the CPU 61, and also outputs the operation signal obtained by operating the mouse to the CPU 61.

The RAM 63 has a work memory area for storing a designated application program, input instructions, input data, process results, and the like.

The display unit 64 is a CRT (Cathode Ray Tube), a liquid crystal display unit, or the like, and displays the display data input from the CPU 61.

The printer 65 prints, for example, the data created by various application programs corresponding to the personal computer 6.

The communication control section 66 is constituted by a modem, a terminal adapter, a router, and the like, and performs control to communicate with an external device through a communication line such as a telephone line, ISDN line, or leased line.

The storage medium 67 has the storage medium 68 in which programs, data, and the like are stored in advance. This storage medium 68 is a magnetic or optical recording medium or semiconductor memory. The storage medium 68 is permanently or detachably mounted in the storage unit 67. The storage medium 68 stores various application programs corresponding to the personal computer 6, the data processed by the respective processing programs, and the like.

The application programs stored in the storage medium 68 in the storage unit 67 include an electronic mail application. This electronic mail application is used to transmit/receive electronic mail by performing communication with the mail server 3 connected through a communication line according to an electronic mail protocol such as SMTP, POP, or the like. This electronic mail application has various functions for assisting the electronic mail transmitting/receiving operation of the user. For example, the application serves to perform management (edition, display, storage, deletion, and the like) of transmission/reception electronic mail files, management of a mail address book, setting of a transmission/reception schedule, encryption, decryption, and the like.

The mail address book created by the electronic mail application is stored in the storage medium 68. In this mail address book, a plurality of sets of mail addresses, user names, user telephone numbers, addresses, and memos, and the like are registered in correspondence with each other.

Assume that each of subaddress for classifying a mail address corresponding to one account into a plurality of destinations is added to the mail address to allow a plurality of users to use the account. In this case, as shown in FIG. 5, a plurality of sets of mail addresses, distant user names, distant user telephone numbers, addresses, mail addresses, subaddresses, memos, and the like are registered in the mail address book in subaddress designated for the respective users, mail addresses corresponding to accounts.

The programs, data, and the like to be stored in the storage medium 68 may be received from another device connected through a communication line or the like. In addition, a storage unit having the storage medium 68 may be mounted in another device connected through a communication line or the like to allow the use of the programs, data, and the like stored in the storage medium 68 through the communication line.

The notebook PC (Personal Computer) 8 in FIG. 1 has substantially the same configuration as that of the personal computer 6 in FIG. 4 except that the PC 8 in FIG. 1 is connected to the PHS terminal 7 through a PC card slot or the like to perform communication through the PHS terminal 7.

The PHS terminal (radio telephone set) 7 in FIG. 1 has the same configuration as that of the communication function of the PDA 5 incorporating the radio communication function in FIG. 3. Since the communication performed by connecting this radio telephone set 7 to the notebook PC 8 is almost the same as that performed by the PDA 5 incorporating the radio communication function, illustration and a detailed description of the corresponding configuration will be omitted.

Figure 6:
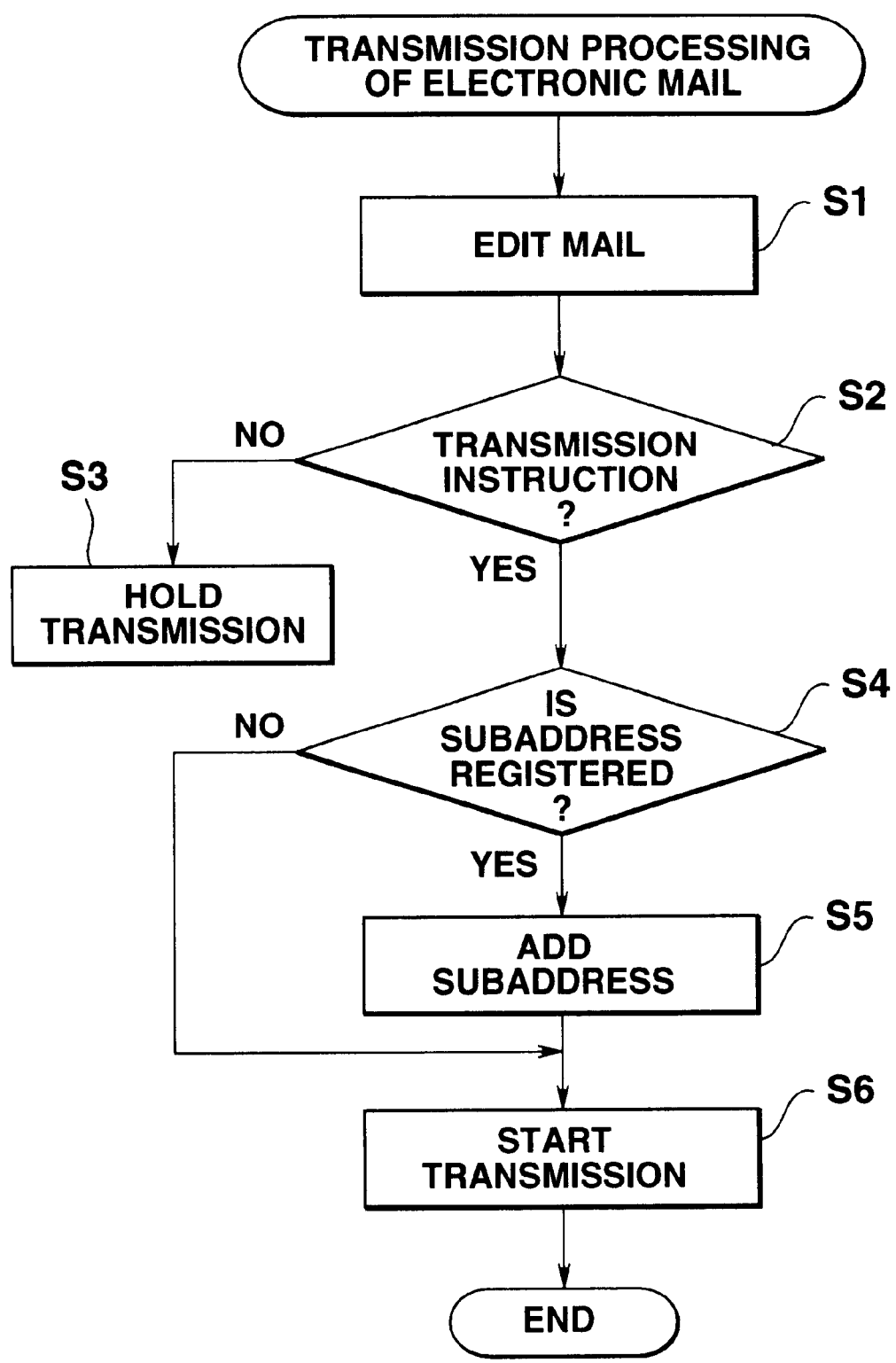
FIG. 6 is a flow chart showing the transmission processing of an electronic mail of the PDA 5 incorporating the radio communication function in the first embodiment.

FIG. 6 is a flow chart showing the electronic mail transmission processing to be performed when the electronic mail created by the PDA 5 incorporating the radio communication function is to be transmitted to the mail server 3 through the radio base station 4 and the public network 2.

The operation associated with the electronic mail transmission processing in the first embodiment having the above configuration will be described next with reference to FIG. 6.

(Electronic Mail Transmission Processing from PDA 5 Incorporating Radio Communication Function to Mail Server 3)

In the PDA 5 incorporating the radio communication function in FIG. 3, when the user inputs an instruction to start the electronic mail application with the key input section 508, the control section 507 reads out the electronic mail application program from the storage medium 514 and stores it in the work memory area in the RAM 512, and starts executing the program. When the user inputs an instruction to create mail with the key input section 508, the control section 507 executes the mail edition (or creating) program of the electronic mail application, and displays the mail edition window on the display section 509 (step S1).

When the user inputs an instruction to terminate the mail edition processing after inputting a distant user name, a mail address corresponding to a destination account, a subject, a message, and the like by using the key input section 508, the control-section 507 determines whether an instruction to transmit the edited (or created) mail is input or not(step S2).

If it is determined in step S2 that no mail transmission instruction is input, the transmission of the mail is suspended, and the edited mail is stored in a predetermined memory area in the storage medium 514 (step S3). The suspended mail stored in the storage medium 514 is transmitted later, when a transmission instruction for the suspended mail is input.

If it is determined in step S2 that a mail transmission instruction is input, the control section 507 refers to the mail address book stored in the storage medium 514 on the basis of the input contents in step S2 to determine whether the mail address and subaddress of the destination are registered or not (step S4).

If it is determined in step S4 that subaddress corresponding to the destination is registered in address book, the control section 507 add the subaddress to the mail address as an identifier (step S5), and starts transmitting the mail to the mail server 3 (step S6). Upon completion of the transmission, the control section 507 terminates the electronic mail transmission processing.

If it is determined in step S4 that no subaddress is registered in the address book, the control section 507 starts transmitting the edited mail to the mail server 3 in FIG. 1 without adding any subaddress to the mail address (step S6). Upon completion of the transmission, the control section 507 terminates the electronic mail transmission processing.

If the mail address is "user name@ organization name country name", the subaddress as the identifier is added as follows:

sample 1: james@zzzzz.or.jp(xxxxx) ((xxxxx) is the subaddress)

sample 2: james@zzzzz.or.jp"ooooo" ("ooooo" is the subaddress)

This subaddress can be arbitrarily set except for the limitations that the period "." and "@" used in the format of a main address (a mail address assigned to one account) cannot be used. Note that both the electronic mail application in the mail server 3 and the electronic mail application in the PDA 5 or personal computer 6 must be programmed to be capable of recognizing subaddress identifiers. Note that the method of adding subaddress is not limited to this. For example, a subaddress may be added as extension information to the header of an electric mail.

If it is determined in step S4 that no subaddress is designated for the address of the destination, the control section 507 starts transmitting the edited mail to the destination by regarding the address as a usual mail address, having no subaddress (step S6). Upon completion of this transmission processing, the control section 507 terminates the electronic mail transmission processing.

(Electronic Mail Reception Processing from Mail Server 3 to PDA 5 Incorporating Radio Communication Function)

Figure 7:
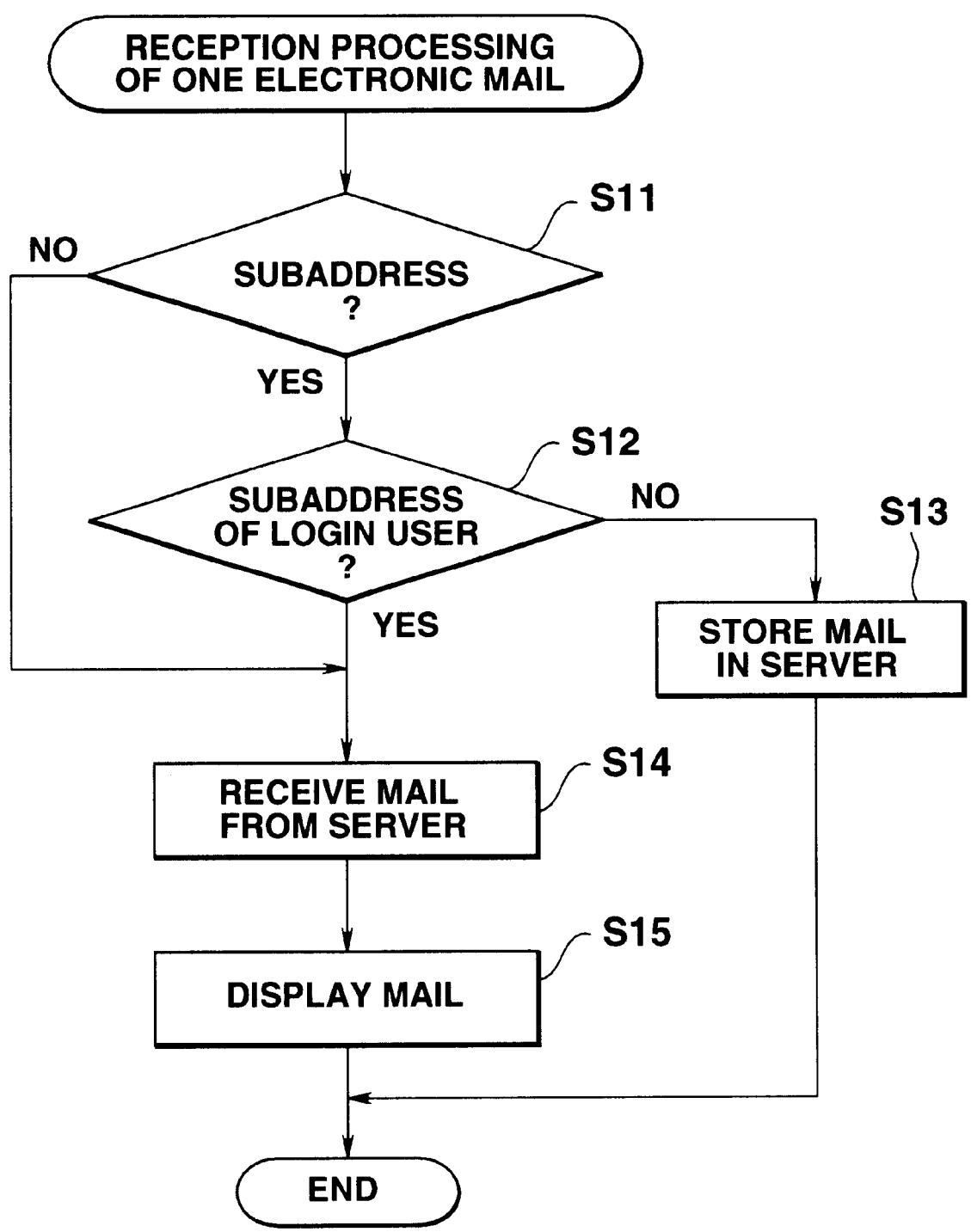
FIG. 7 is a flow chart showing the reception processing of one electronic mail of the PDA 5 incorporating the radio communication function in the first embodiment.

The electronic mail reception processing to be performed when the PDA 5 incorporating the radio communication function (notebook PC 8 or personal computer 6) receives electronic mail from the mail server 3 in FIG. 1 through the public network 2 will be described in detail next with reference to the flow chart of FIG. 7.

In the PDA 5 incorporating the radio communication function in FIG. 3, when the user inputs an instruction to start the electronic mail application with the key input section 508, the control section 507 reads out the electronic mail application program from the storage medium 514, stores it in the work memory area in the RAM 512, and starts executing the program. When the user inputs a mail reception instruction with the key input section 508, the control section 507 performs dial-up connection (i.e., the dial-up connection is to connect with a provider's server using a internet protocol through a public network) with a provider, personal computer communication company, or the like that has a mail server for managing the mail address of the user, in accordance with the dial-up connection settings set by the user.

More specifically, first of all, the control section 507 transmits a communication channel allocation request signal to the radio base station 4 through a control channel, receives the communication channel allocated by the radio base station 4 in response to the allocation request, and shifts to the allocated communication channel. The control section 507 then reads out the dial-up connection setting data stored in the storage medium 514 in the storage unit 513, and transfers the telephone number data set in the dial-up connection setting data to the communication processing section 501. The communication processing section 501 converts the telephone number data into a signal conforming to the TDMA/TDD scheme, and outputs it to the radio section 503. The radio section 503 converts this signal into a transmission signal in a predetermined frequency band in accordance with the π/4 shift QPSK scheme, and outputs it to the antenna 502. The radio transmission signal representing an originating request is transmitted from the antenna 502 to the radio base station 4.

Upon reception of the signal representing the originating request from the PDA 5 incorporating the radio communication function through the radio base station 4, the public network 2, and the communication channel, the mail server 3 performs termination response processing to set a call with the PDA 5. When a communication path is set between the PDA 5 and the mail server 3, the control section 507 transmits/receives data to/from the mail server 3 in accordance with the TCP/IP protocol setting data set in the dial-up connection setting data.

After the dial-up connection, the control section 507 is performed a login process (including a certification process) according to a login data (e.g., a login name (account), a password, etc.).

The PDA 5 TCP-connected to the mail server 3 in the above manner accesses the corresponding mailbox set in the storage medium 38 in the storage unit 37 of the mail server 3 according to a POP command. If newly received electronic mail is present in the mail server 3, the control section 507 refers to the header of the electronic mail to determine whether a subaddress as an identifier is added to the destination mail address of the electronic mail (or in the header of the electronic mail) or not. The control section 507 performs this determination processing for each electronic mail (step S11).

If it is determined in step S11 that no subaddress is added to the newly received electronic mail, the control section 507 receives the electronic mail having the mail address corresponding to the account from the mail server 3 (step S14), and stores the received electronic mail in the storage medium 514. The control section 507 displays the received electronic mail on the basis of a user's instruction (step S15). The control section 507 then disconnects the communication channel from the mail server 3, and terminates the electronic mail reception processing. That is, the control section 507 is performed a logout process.

If it is determined in step S11 that a subaddress is added to the newly received electronic mail, the control section 507 determines whether the subaddress of the newly received electronic mail corresponds to the login user or not (step S12).

If the subaddress does not correspond to the login user, the control section 507 determines that the electronic mail is addressed to another user, and performs the logout without receiving any electronic mail from the mailbox set in the storage medium 38 in the storage unit 37 of the mail server 3 (step S13).

If it is determined in step S12 that the subaddress of the newly received electronic mail corresponds to the login user, the control section 507 designates the subaddress and receives the electronic mail from the mail server 3 (step S14), and stores the received electronic mail in the storage medium 514. The control section 507 displays the received electronic mail on the basis of the user's instruction (step S15). The control section 507 then disconnects the communication channel and terminates the electronic mail reception processing (logout).

In the above description of the electronic mail transmission processing (see FIG. 6) and the electronic mail reception processing (see FIG. 7), the PDA 5 incorporating the radio communication function is used to access the mail server 3 through the radio base stations 4 and the public network 2. However, this description applies to a case wherein access is made by using the personal computer 6 or the radio communication unit 7 to which the notebook PC 8 is connected.

Assume that a submailbox is set in a mailbox set in the storage medium 38 of the mail server 3, and access is made to the mailbox and the submailbox through the PDA 5 incorporating the radio communication function. In this case, the control section 507 may perform a login process to access the mailbox or submailbox on the basis of the login name (including subaddress) and password input for the right.

When folders are prepared for the respective subaddress in the mail server 3, and the folders are classified according to the respective subaddress, the control section 507 may access only the folder corresponding to the self-subaddress and the common folder. That is, the mail server 3 limits to access to the mailbox corresponding to the mail address by the login process including the subaddress.

According to the configuration described above, when mail is to be transmitted to the mail server 3 from the PDA 5, the control section 507 of the PDA 5 incorporating the radio communication function reads out the electronic mail application program from the storage medium 514 in response to the instruction input from the key input section 508, stores it in the work memory area of the RAM 512, and starts executing the program. The control section 507 then edits the electronic mail, and detects whether a transmission instruction is input for the edited electronic mail. If it is detected that the transmission instruction is input, the control section 507 detects, on the basis of the mail address book stored in the storage medium 514, whether the mail address and subaddress of the destination are registered or not. If it is determined that the subaddress is registered, the subaddress corresponding to the destination is added as an identifier to the mail address, and the electronic mail is transmitted to the mail server 3. If it is determined that no subaddress is registered, the electronic mail is transmitted to the mail server 3 without adding any subaddress to the mail address.

When mail is to be received from the mail server 3, the control section 507 of the PDA 5 incorporating the radio communication function performs TCP connection with the mail server 3 by predetermined communication processing, and accesses the corresponding mail box set in the storage medium 38 in the storage unit 37 of the mail server 3 according to a POP command. If newly received electronic mail is present in the mail server 3, the control section 507 refers to the header of the electronic mail to determine whether a subaddress as an identifier is added to the destination mail address of the electronic mail (or in the header of the electronic mail) or not. The control section 507 then receives the electronic mail having the mail address corresponding to the account and the mail added the self-subaddress from the mail server 3.

When a submailbox is set in a mailbox set in the storage medium 38 in the above reception processing, the CPU 31 limits to access to the mailbox or submailbox on the basis of the login name, the subaddress and password input for the right.

When folders are prepared for the respective subaddress in the mail server 3, and the folders are classified according to the respective subaddress, the control section 507 may access only the folder corresponding to the self-subaddress and the common folder.

When, therefore, individual management of electronic mail can be realized by using subaddresses, and one account can be used by a plurality of users, the following effects can be obtained.

First, each user can receive only electronic mail to which the subaddress of the user is added, and hence can protects his/her privacy.

Therefore, the user can freely transmit electronic mail.

In addition, all the users of the same account receive electronic mail to which only the mail address assigned to the account is added. The common electronic mail can therefore be transmitted to all the users by transmitting it upon adding the mail address assigned to the account thereto. This can save the labor of transmitting electronic mail to each user.

Second, since this system is designed to allow each user to receive only electronic mail addressed to himself/herself, the time required for connection to a provider can be minimized, thereby eliminating waste in various points, e.g., communication expenses, time, and the power consumed by the communication terminal.

Third, all the users need not acquire accounts respectively, and hence the charges for accounts can be saved.

(Second Embodiment)

In the first embodiment, a subaddress for classifying the mail address corresponding to one account into a plurality of destinations is used to allow a plurality of users to the same mail address.

In contrast to this, one user may use a subaddress for classifying the mail address corresponding to one account into a plurality of destinations. For example, the user can selectively use different subaddresses for electronic mail reception depending on the situation, e.g., a subaddress for business mail and a subaddress for private electronic mail.

In an electronic mail communication system according to the second embodiment, the user uses one mail address for a plurality of destinations by using subaddresses, and reception of electronic mail is controlled based on a reception condition table. The reception condition table stores a reception allowable application program, and sets and executes them. This reception condition is used to selectively use a subaddress that allows reception in accordance with a time zone or place or limit the use of a subaddress in accordance with a time zone or place in which reception is allowed.

As the same components of the basic configuration of the electronic mail communication system of the second embodiment as those of the first embodiment, the components shown in FIGS. 1 to 4 are used without any change, and a detailed description thereof will be omitted.

A position detection means is provided in a radio base station 4 in FIG. 1 or a host center station of the radio base station 4 so that the base station information or area information obtained on the basis of position registration performed by the radio communication function can be provided.

A control section 507 of a PDA 5 incorporating a radio communication function in FIG. 3 reads out an electronic mail application from a storage medium 514, and executes electronic mail reception processing (to be referred to as electronic mail reception processing 2 hereinafter) according to the second embodiment. First of all, the control section 507 reads out the reception conditions registered in advance by the user from the storage medium 514, together with the application program, and sets and executes them. This reception condition is used to selectively use a subaddress that allows reception in accordance with a time zone or place or limit the use of a subaddress in accordance with a time zone or place in which reception is allowed.

The control section 507 accesses the corresponding mailbox set in a storage medium 38 of a mail server 3 in response to a POP command. If there is newly received electronic mail in the mail server 3, the control section 507 refers to the header of the electronic mail to determine whether or not a subaddress is added to the mail.

The control section 507 has a clocking function of measuring the time to detect a current status. The control section 507 also receives position information from the radio base station 4 to detect a current status. The control section 507 collates the current status such as the time and the position information with a reception allowable status corresponding to the subaddress added the received mail, thereby determining whether or not the reception of the newly received mail is allowed. The control section 507 receives (downloads) the electronic mail having a subaddress when the current status coincides with the reception allowable status corresponding to the subaddress. Otherwise, the control section 507 disconnects the communication channel and terminates electronic mail reception processing 2 without receiving the electronic mail newly received by the mail server 3.

Figure 8:
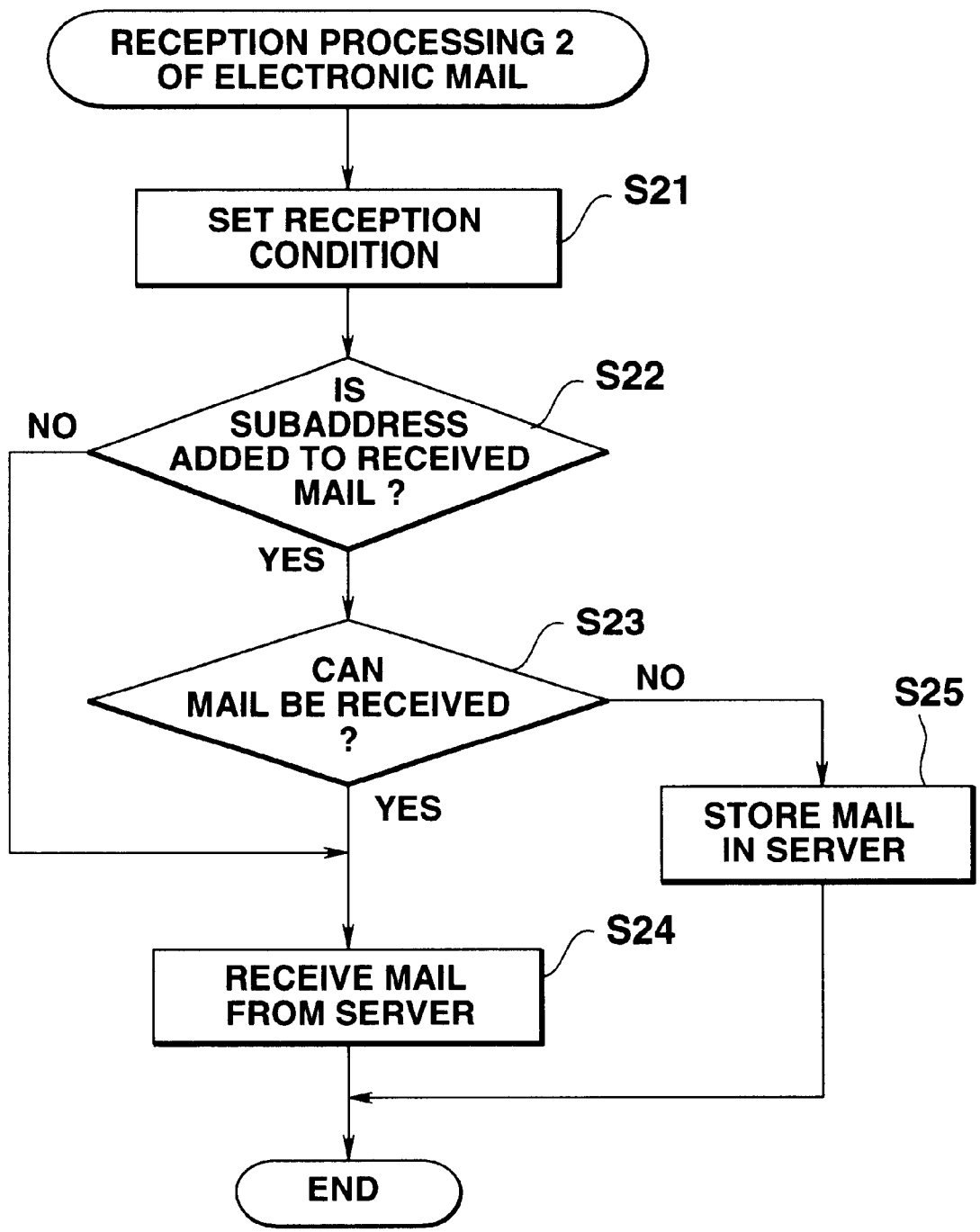
FIG. 8 is a flow chart showing the second reception processing of an electronic mail of the PDA 5 incorporating the radio communication function in the second embodiment.

The operation of the second embodiment having the above configuration will be described next with reference to the flow chart of FIG. 8.

In the PDA 5 incorporating the radio communication function in FIG. 3, when the user inputs an instruction to start the electronic mail application by operating a key input section 508, the control section 507 reads out the electronic mail application program from the storage medium 514, stores it in the work memory area in a RAM 512, and starts executing the program.

The control section 507 then reads out reception conditions from the storage medium 514, and sets the reception allowable statuses and the corresponding subaddress in the RAM 512 (step S21).

These reception allowable statuses and the corresponding subaddress are input/registered by the user in advance and stored in the storage medium 514 in a storage unit 513. With this reception allowable status, for example, time information indicating that "only business mail can be received until 17 : 00" or the like and place information indicating that "only business mail can be received in office" or the like can be set corresponding to the subaddress. Note that this time measuring is performed by the clocking section of the control section 507, and detection of a place is realized by the base station information or area information obtained on the basis of position registration performed by the radio communication function.

When the user inputs an instruction to receive the mail with the key input section 508, as mentioned about, the control section 507 performs dial-up connection and login process with a provider.

The PDA 5 TCP-connected to the mail server 3 in the above manner accesses the corresponding mailbox set in the storage medium 38 in a storage unit 37 of the mail server 3. If there is electronic mail newly received by the mail server 3, the control section 507 refers to the header of the electronic mail to determine whether or not a subaddress as an identifier is added to the destination mail address of the electronic mail (or in the header of the electronic mail) (step S22).

If it is determined in step S22 that no subaddress is added to the newly received electronic mall, the control section 507 receives all the electronic mail having the mail address corresponding to the account from the mail server 3 (step S24), and disconnects the communication channel, thereby terminating the electronic mail reception processing.

If it is determined in step S22 that a subaddress is added to the newly received electronic mail, the control section 507 receives the position information from the radio base station 4, and measures the time by using the clocking function. The control section 507 then collates the position information received from the radio base station 4 and the time measured by the clocking function with the reception allowable status corresponding to the subaddress, to determine whether or not the electronic mail having the subaddress can be received (step S23).

If the position information and the time do not coincide with the reception allowable status corresponding to the subaddress, the control section 507 determines that the reception of the electronic mail is not allowed. The control section 507 then performs logout process without receiving the electronic mail from the mailbox set in the storage medium 38 in the storage unit 37 of the mail server 3 (step S25).

If it is determined in step S23 that the reception of the electronic mail is allowed, the control section 507 receives the electronic mail from the mail server 3 (step S24). The control section 507 then performs logout process and terminates the electronic mail reception processing.

In the above description of the electronic mail transmission processing (see FIG. 6) and the electronic mail reception processing (FIG. 7), the PDA 5 incorporating the radio communication function is used to access the mail server 3 through the radio base stations 4 and the public network 2. However, the same applies to a case wherein the mail server 3 is accessed by using a personal computer 6 or a radio communication unit 7 to which a notebook PC 8 is connected.

Meanwhile, assume that each mailbox set in the storage medium 38 is divided into submailboxes in correspondence with subaddress for classifying a mail address into a plurality of destinations, or folders are prepared for the respective subaddress in the mail server 3 and classified according to the respective subaddress. In this case, before access to a mail box, the control section 507 may receive position information and measures the time to perform collation with the reception allowable status. Then, the control section 507 may access only the submailbox (folder) having the subaddress corresponding to the reception allowable status that coincides with the measured time and the mailbox (common folder) corresponding to the account, and receive the electronic mail.

According to this configuration described above, in an electronic mail communication system 1 of the second embodiment, when mail reception processing 2 is designated, the control section 507 reads out the electronic mail application from the storage medium 514 and the input/registered reception allowable statuses, executes the application, and sets the reception allowable statuses. The PDA 5 incorporating the radio communication function is TCP-connected to the mail server 3 by predetermined connection processing, and accesses the corresponding mail box set in the storage medium 38 in the storage unit 37 of the mail server 3 according to a POP command. If there is electronic mail newly received by the mail server 3, the control section 507 refers to the header of the electronic mail to determine whether or not a subaddress as an identifier is added to the destination mail address of the electronic mail (or in the header of the electronic mail). If it is determined that no subaddress is added to the newly received electronic mail, the control section 507 receives the electronic mail to which only the mail address corresponding to the account is added from the mail server 3.

If it is determined that a subaddress is added to the newly received electronic mail, the control section 507 collates the position information received from the radio base station 4 and the time measured by the clocking function with the reception allowable status corresponding to the subaddress to determine whether or not the reception of the electronic mail having the subaddress is allowable.

If it is determined that the reception of the electronic mail having the subaddress is not allowed, the control section 507 determines that the electronic mail cannot be received. The control section 507 then disconnects the communication channel and terminates the electronic mail reception processing without receiving any electronic mail from the mail box set in the storage medium 38 in the storage unit 37 of the mail server 3. If it is determined that the reception of the electronic mail having the subaddress is allowed, the control section 507 determines that the electronic mail can be received. The control section 507 then receives the electronic mail from the mail server 3 and disconnects the communication channel, thereby terminating the electronic mail reception processing.

With the use of subaddresses corresponding to reception allowable statuses, each electronic mail can be managed independently. When each user uses one account while assigning it to a plurality of destinations, the following results can be obtained.

First, each user need not acquire a plurality of accounts, and hence can save the charges for accounts.

Second, electronic mails can be selectively received as, for example, business mail and private mail, by making reception allowable statuses correspond to subaddress.

Note that the configuration of the second embodiment, in which reception allowable statuses are input/registered in advance to the storage medium 514, the reception allowable statuses are made to correspond to subaddresses, and reception control is performed by using the base station information or area information based on position registration performed by clocking function of the control section 507 and the radio communication function, can be applied to the first embodiment.

(Third Embodiment)

In the first and second embodiments, when the mail server 3 is to be accessed by using the PDA 5 incorporating the radio communication function or the notebook PC 8 to which the radio communication unit 7 is connected, radio communication is performed through the radio base stations 4. When the mail server 3 is to be accessed by using the personal computer 6, the personal computer 6 is directly connected to the public network 2.

In the first embodiment, subaddresses and users are made to correspond to each other, and one mail address corresponding to each account is classified into addresses of respective users by the subaddresses, thereby allowing a plurality of users to use the common account.

In the second embodiment, the subaddresses are made to correspond to the reception conditions, and one mail address corresponding to each account is classified into plural reception conditions by the subaddresses, thereby allowing each user to use the subaddresses.

In contrast to this, in the third embodiment, radio communication is performed by using a so-called indoor base station (or parents base station,of a cordless phone) 9 as a master unit with respect to a PDA 5 incorporating a radio communication function or a radio communication unit 7, and a personal computer 6 is wired to the indoor base station 9 to be used. Subaddress are made to correspond to the PDA 5, the radio communication unit 7, and the wired personal computer 6 which are used as subsidiary units so that one mail address corresponding to each account is classified into addresses of plural communication devices, e.g., personal computers, thereby allowing a plurality of devices to use the common account.

Since the basic configuration of the electronic mail communication system of the third embodiment is the same as that of the first embodiment, the configuration shown in FIGS. 1 to 4 is used without any change, and a detailed description thereof will be omitted.

In the third embodiment, as in the first and second embodiments, all the PDA 5 having the radio communication function, the radio communication unit 7, and the personal computer 6 wired to the indoor base station 9 can be used. For the sake of simplicity, however, a case wherein the PDA 5 is used as a subsidiary unit of the indoor base station 9 will be exclusively described below.

Figure 9:
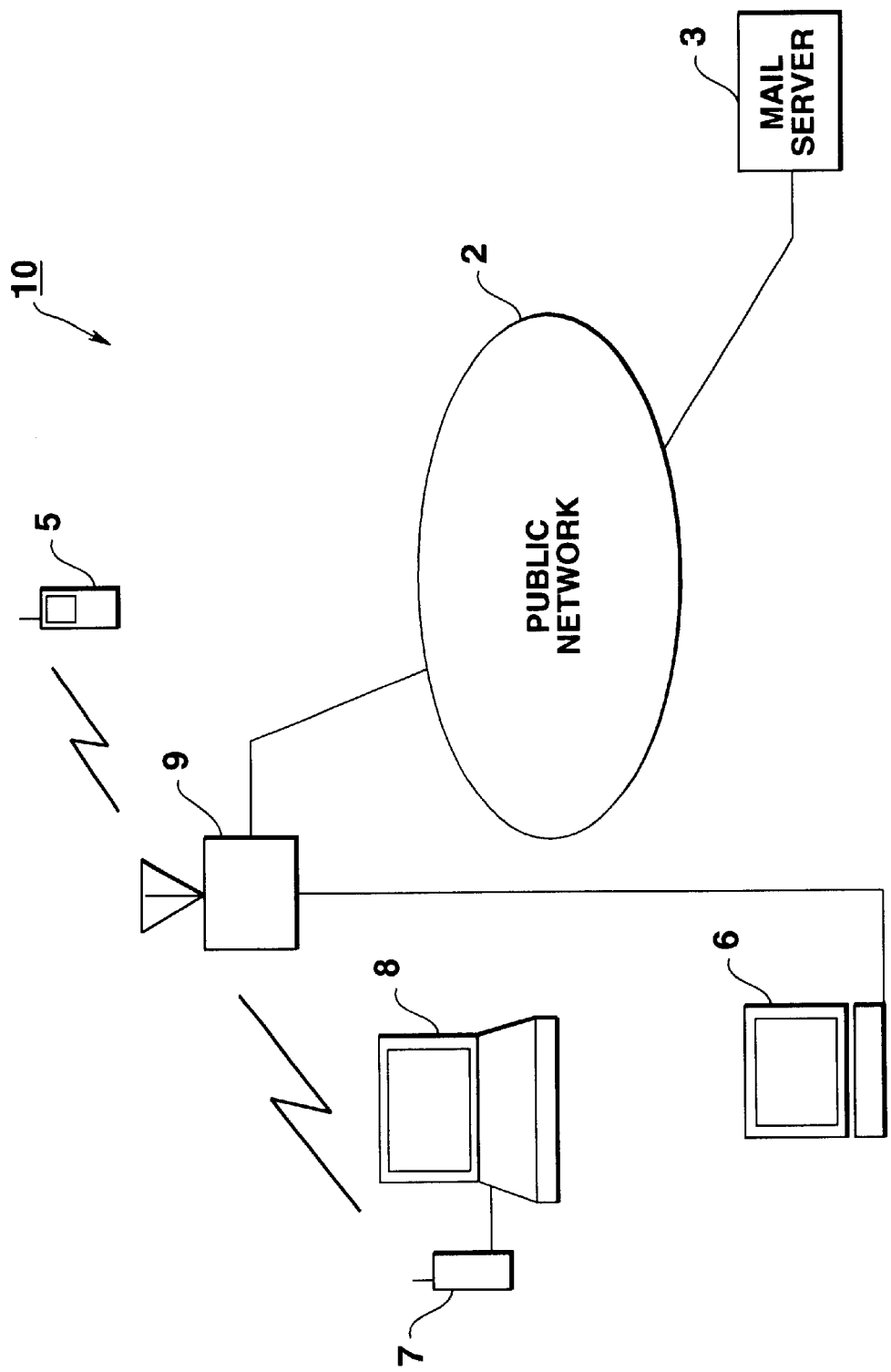
FIG. 9 shows the schematic configuration of an electronic mail communication system 10 according to the third embodiment.

FIG. 9 shows the configuration of an electronic mail system 10 according to the third embodiment. Referring to FIG. 9, in the electronic mail system 10, the PDA 5 having the radio communication function, the personal computer 6, or the radio communication unit 7 connected to a notebook PC 8 can access, through the indoor base station 9, a mail server 3 connected to a public network 2.

Referring to FIG. 9, the indoor base station 9 can be used as a telephone set connected to the public network 2 through a line (e.g., a subscriber line) and also serves as a master unit when the PDA 5 or the radio communication unit 7 is used as a cordless phone.

Figure 10:
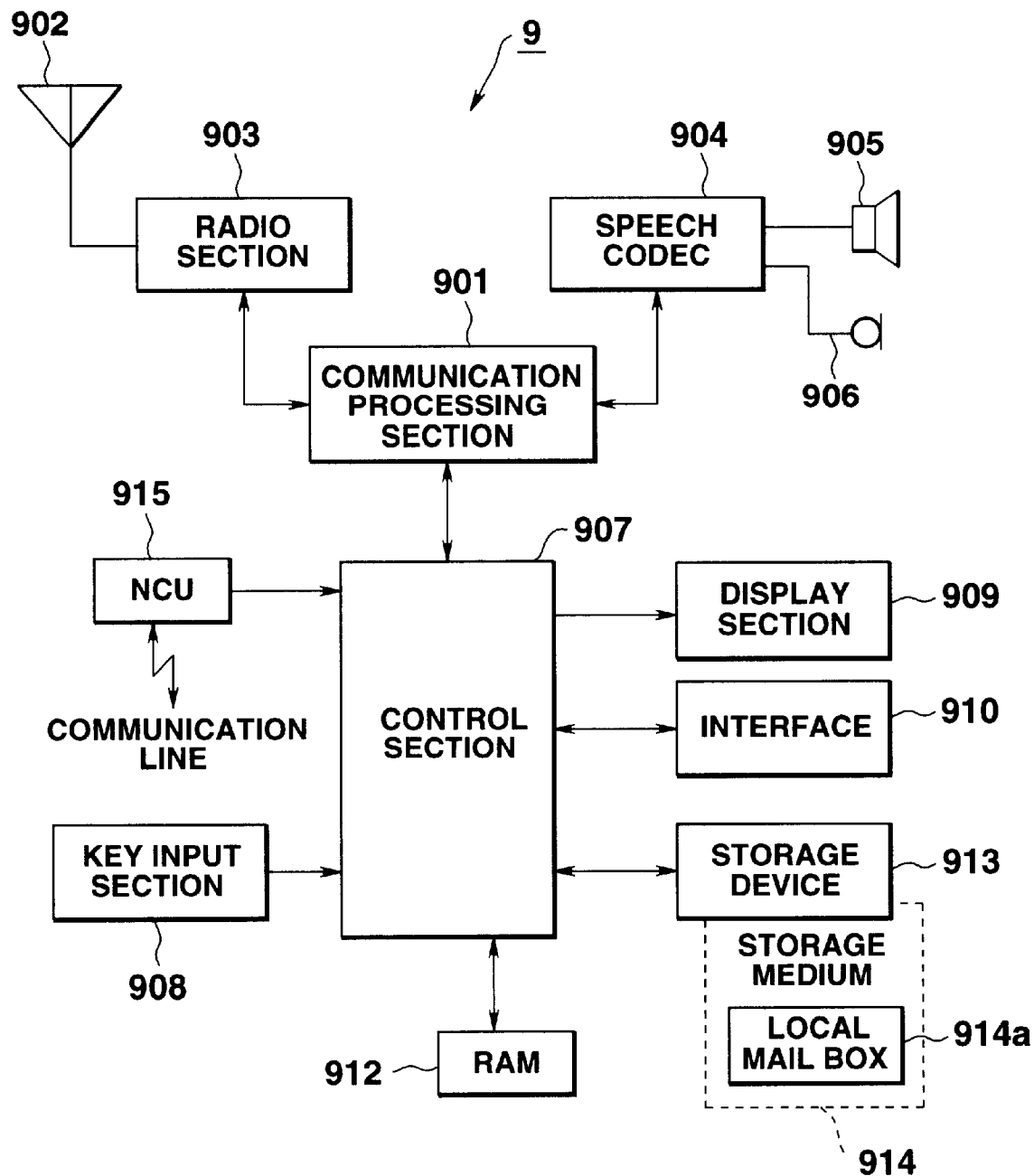
FIG. 10 is a circuit block diagram of the indoor base station 9 of FIG. 9.

FIG. 10 is a block diagram showing the configuration of the indoor base station 9. Referring to FIG. 10, the indoor base station 9 is comprised of a communication processing section 901, an antenna 902, a radio section 903, a speech conversion circuit 904, a loudspeaker 905, a microphone 906, a control section 907, a key input section 908, a display section 909, an interface 910, a RAM 912, a storage unit 913, a storage medium 914, and an NCU 915.

The communication processing section 901 converts the compressed speech signal input from the speech conversion circuit 904 or the compressed coded communication data input from the control section 907 into a signal conforming to a predetermined radio communication scheme, and outputs it to the radio section 903. The communication processing section 901 outputs the reception data string input from the radio section 903 to the control section 907 or outputs the received compressed speech signal to the speech conversion circuit 904.

The antenna 902 transmits/receives radio transmission signals and radio reception signals in a predetermined frequency band between the PDA 5 incorporating the radio communication function and the radio communication unit 7.

The radio section 903 is constituted by an RF conversion/ modulation circuit and the like. The radio section 903 modulates the signal conforming to a predetermined communication scheme and input from the communication processing section 901 in accordance with a predetermined modulation scheme, converts the modulated signal into a transmission signal in a predetermined frequency band, and outputs it to the antenna 902. The radio section 903 also converts the radio signal in the predetermined frequency band which is input through the antenna 902 into an intermediate frequency signal, demodulates the radio reception signal conforming to the predetermined modulation scheme, converts the signal into a data string, and outputs it to the communication processing section 901.

The speech conversion circuit 904 compression-codes the speech input from the microphone 906, and outputs the resultant data to the communication processing section 901. In addition, the speech conversion circuit 904 decodes the compressed speech signal input from the communication processing section 901, converts the signal into an analog signal, and outputs it to the loudspeaker 905.

The loudspeaker 905 outputs the analog speech signal input from the speech conversion circuit 904 as sounds. The microphone 906 senses user's speech, converts it into an analog speech signal, and outputs it to the speech conversion circuit 904. The loudspeaker 905 and the microphone 906 constitute a handset when the indoor base station 9 is used as a telephone set.

The control section 907 reads out the designated application program of the application programs corresponding to the indoor base station 9 and stored in the storage medium 914 in the storage unit 913, and stores the program in the work memory area in the RAM 912, together with various instructions and data input with the key input section 908. The control section 907 then executes various processes in accordance with the input instruction and input data and the program stored in the RAM 912, stores the process result in the work memory area in the RAM 912, and displays it on the display section 909. The control section 907 stores the process result, stored in the work memory area, in the location in the storage medium 914 in the storage unit 913 which is designated by the input from the key input section 908.

The control section 907 executes electronic mail termination notification processing (see FIG. 12) (to be described later) or executes electronic mail transfer processing (see FIG. 14) when an electronic mail transmission request in response to the mail termination notification is transmitted from the PDA 5 incorporating the radio communication function.

The control section 907 installs a communication driver corresponding to a useable communication port, terminal, slot and the like (describe after) in a communication program. That is, the control section 907 communicates with an external apparatus through the communication port, terminal, slot or the like.

The key input section 908 has various keys such as a power key, an off-hook key, an on-hook key, a ten-key pad, and a playback key, and outputs various operation keys corresponding to key input operations to the control section 907. The display section 909 is constituted by a liquid crystal panel and the like, and displays the display data input or designated by the control section 907.

The interface 910 is comprised of an RS-232C terminal, an IrDA port, a PC card slot, and the like. The indoor base station 9 can be connected to a portable terminal, a desktop personal computer, or the like through the interface 910 using the communication program installed in the each communication driver. In the case of the electronic mail system 10 in FIG. 9, for example, the personal computer 6 is connected through the RS-233C terminal.

The RAM 912 forms a work memory area in which various data to be processed are temporarily stored when various control processes are executed by the control section 907.

The storage medium 914 is permanently or detachably mounted in the storage unit 913. The storage medium 914 is a magnetic or optical recording medium or semiconductor memory. This storage medium 914 stores various control programs to be executed by the control section 907. These control programs are stored in the form of program codes that can be read by the control section 907.

The above control programs include an electronic mail application. This electronic mail application is used to receive electronic mail by performing communication with the mail server 3 connected through a communication line according to an electronic mail protocol such as POP. This electronic mail application includes a program for electronic mail termination notification processing (see FIG. 12) (to be described later) and a program for electronic mail transfer processing (see FIG. 14) (to be described later), and manages the electronic mail sent to a plurality of subaddress corresponding to the respective terminals such as the PDA 5 incorporating the radio communication function, the personal computer 6, and the radio communication unit 7 in a unified way. In addition, a local mailbox 914a like the one shown in FIG. 11 is set in the storage medium 914 in the storage unit 913.

Referring to FIG. 11, a plurality of sets of terminal telephone numbers and terminal abilities are stored in the local mailbox 914a in correspondence with the respective subaddress, and received mail data are stored at the respective subaddresses.

Each of subaddress is added to a mail address allocated to one account when the mail address is to be classified into a plurality of destinations. The subaddress are the same as those described in detail in the first embodiment.

The terminal telephone numbers are data for making the respective subaddress correspond to the respective terminals. As the terminal telephone numbers, data indicating the devices to which the terminal used by the user is to be connected are stored in correspondence with the respective subaddress. For example, the telephone numbers of the PDA 5 incorporating the radio communication function and the radio communication unit 7 (or the identification numbers of the terminals to be locally used, e.g., subsidiary unit numbers) are designated. In addition, with regard to the terminal wired to the indoor base station 9 through the interface 910, the communication port number of the port, the terminal, or the slot to which the terminal is connected is designated.

The terminal abilities are data representing the various abilities or specifications of the respective terminals corresponding to the respective subaddress. Although the types of terminals are set in FIG. 11, data indicating display performance, the presence/absence of a sound function, or graphic performance can be set in detail in practice. Alternatively, the ability information of each type of terminal may be stored in a ROM 911 in advance, and data indicating "terminal ability" may be automatically acquired by setting the product name of each terminal. By setting this "terminal ability", for example, the image data added to mail can be selectively processed. For example, this image data is not transferred to a terminal having no image display function, e.g., the PDA 5 incorporating the radio communication function.

The NCU (Network Control Unit) 915 is a device (e.g., a TA (Terminal Adapter) as an ISDN network terminating device) to be used when the indoor base station 9 is connected to the public network 2 through a subscriber line to transmit/receive data. The NCU 915 performs control to make transmission/reception data pass through a switching apparatus.

The operation of the third embodiment having the above configuration will be described next with reference to FIGS. 11 to 14.

(Electronic Mail Reception Notification Processing in Indoor Base Station 9)

The electronic mail reception notification processing performed by the indoor base station 9 in FIG. 9 will be described first with reference to the flow chart of FIG. 12. In the reception notification processing, all the mails are simultaneously received from the mail server 3 through the public network 2, and each of the terminals corresponding to the respective subaddress is notified of reception of new mail.

Figure 12:
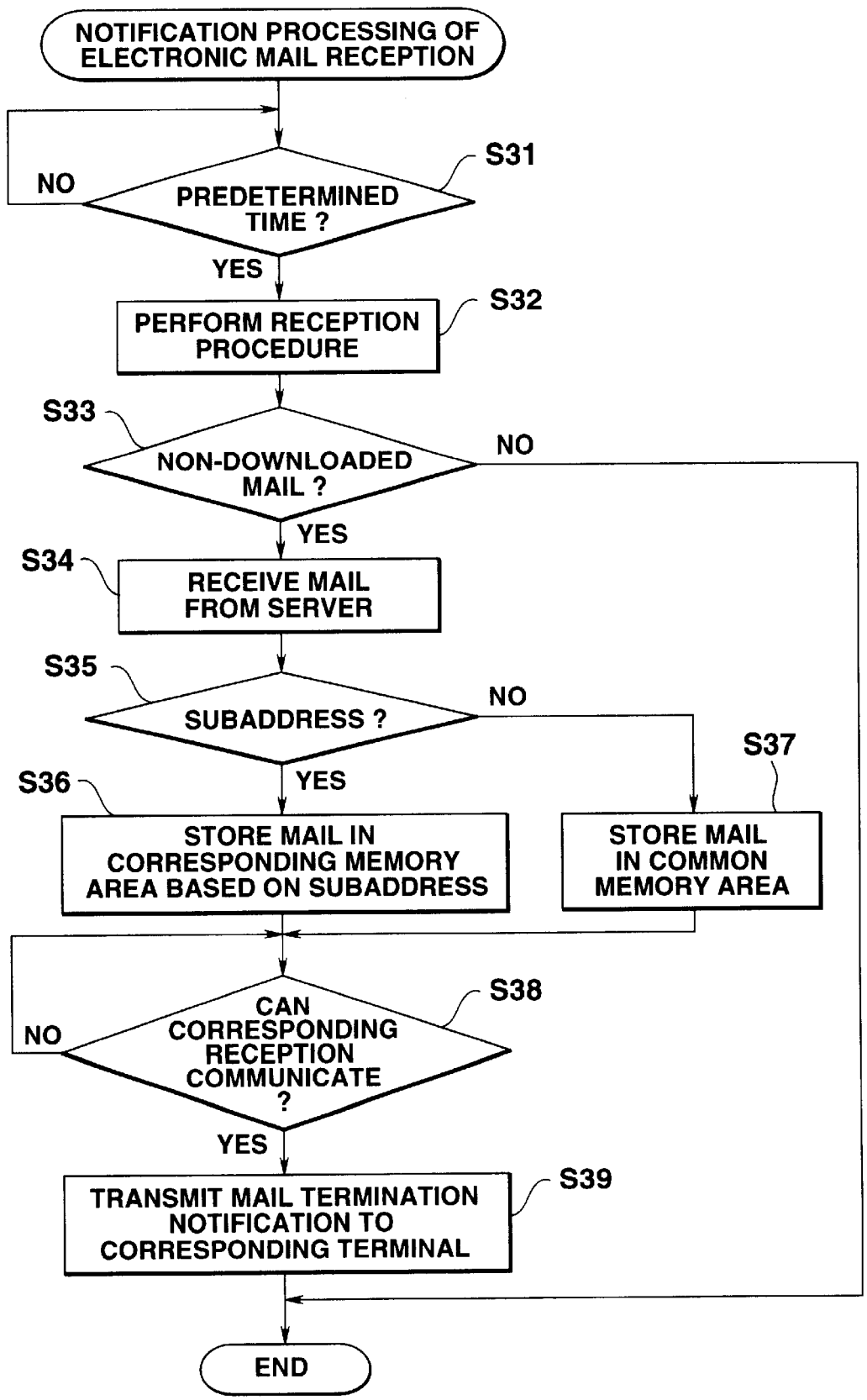
FIG. 12 is a flow chart showing the reception notification processing of an electric mail of the indoor base station of FIG. 9 in the third embodiment.

Referring to FIG. 12, the control section 907 monitors whether the current time coincides with a predetermined time set by the user in advance (step S31) or not. If the current time does not coincide with the predetermined time, the control section 907 keeps monitoring whether the current time coincides with the predetermined time. If it is determined in step S31 that the current time coincides with the predetermined time, the control section 907 performs dial-up connection with a provider, personal computer communication company, or the like which has a mail server for managing the mail address of the user, in accordance with the dial-up connection settings set by the user, and performs login process corresponding to a login data (e.g., login name, password, etc.), and starts a reception procedure (step S32). In this case, the mail server is accessed at predetermined intervals. However, the mail server may be accessed upon reception of a termination notification based on an electronic mail termination notification service (the service of notifying the termination of electronic mail when the electronic mail is terminated by the server).

The control section 907 reads out the dial-up connection setting data stored in the storage medium 914 in the storage unit 913, and outputs the telephone number data set in the dial-up connection setting data to the NCU 915. The NCU 915 transmits an originating request to the public network 2.

Upon reception of the signal representing the originating request from the NCU 915 of the indoor base station 9 through the public network 2, the CPU 31 of the mail server 3 performs termination response processing to connect a communication path to the indoor base station 9. When the communication path is connected between the indoor base station 9 and the mail server 3, the control section 907 transmits/receive data to/from the mail server 3 in accordance with the TCP/IP protocol setting data set in the dial-up connection setting data.

After the above TCP connection, the control section 907 accesses the corresponding mail box set in a storage medium 38 in a storage unit 37 of the mail server 3 according to a POP command to determine whether there is newly received mail that is not downloaded yet (step S33). If it is determined that there is no non-downloaded mail, the control section 907 disconnects the call from the mail server 3 and terminates the electronic mail termination notification processing.

If it is determined in step S33 that there is non-downloaded mail, the control section 907 downloads the non-downloaded mail from the mail server 3 and receives it (step S34). The control section 907 then refers to the header of the received mail to determine whether a subaddress identifier is added to the destination mail address (or as extension information) of the received mail (step S35).

If it is determined in step S35 that a subaddress is added to the received mail, the control section 907 stores the received mail in the corresponding memory area of the local mailbox 914a set for mail having subaddress in the storage medium 914 in the storage unit 913 (step S36).

If it is determined in step S35 that no subaddress is added to the received mail, the control section 907 stores the received mail in the common memory area in FIG. 11, which is set as an area used upon reception of general mail, in the storage medium 914 in the storage unit 913 (step S37).

When the received mail is stored in the predetermined area in step S36 or S37, the control section 907 refers to the terminal number set in correspondence with each subaddress in the local mailbox 914a in FIG. 11 to determine whether the terminal corresponding to the destination (subaddress) of the received mail is ready for communication or not (step S38).

If it is determined in step S38 that the terminal corresponding to the destination of the received mail is not ready for communication because, for example, the terminal is not connected to the indoor base station 9, the power is OFF, or the terminal is outside the communication range, the control section 907 keeps monitoring whether the terminal corresponding the destination of the received mail is ready for communication or not. If it is determined in step S38 that the corresponding terminal is ready for communication, a mail reception notification is transmitted to the corresponding terminal to inform the terminal of the reception of a new mail addressed to the terminal (step S39). When the transmission of this mail termination notification is complete, the control section 907 disconnects the call from the mail server 3 and terminates the electronic mail termination notification processing.

Note that the above mail reception notification may be performed with character data. If the notification is addressed to the PDA 5 incorporating the radio communication function or the radio communication unit 7, the notification may be performed by using a speech message.

(Electronic Mail Reception Processing in PDA 5 Incorporating Radio Communication Function)

The electronic mail reception processing performed by the PDA 5 incorporating the radio communication function in FIG. 9 will be described next with reference to the flow chart of FIG. 13. In this reception processing, when the PDA 5 receives an electronic mail reception notification upon electronic mail reception notification processing performed by the indoor base station 9, the PDA 5 receives the electronic mail addressed to itself from the indoor base station 9.

Figure 13:
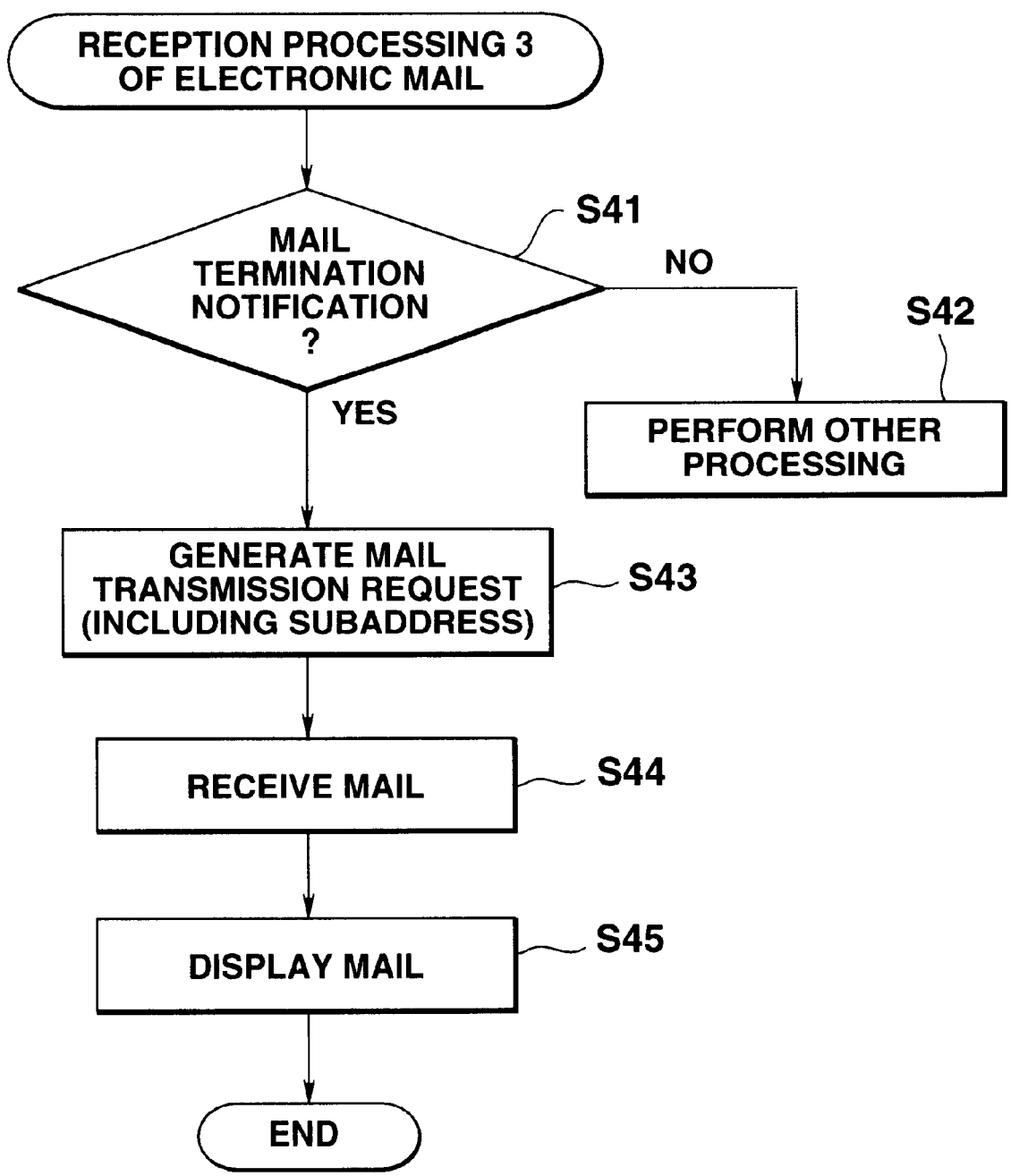
FIG. 13 is a flow chart showing the reception processing of an electric mail of the PDA 5 incorporating the radio communication function of FIG. 9 in the third embodiment.

Referring to FIG. 13, the control section 507 of the PDA 5 incorporating the radio communication function determines whether the mail reception notification is received from the indoor base station 9 or not (step S41). If it is determined that no mail reception notification is received, the control section 507 performs processing other than that associated with the mail server 3 (step S42).

If it is determined in step S41 that the mail reception notification is received from the indoor base station 9, the control section 507 performs radio communication with the indoor base station 9 to transmit a transmission request (include subaddress) for the electronic mail corresponding to the mail reception notification received from the indoor base station 9 (step S43).

In response to the mail transmission request from the PDA 5 incorporating the radio communication function, the indoor base station 9 executes electronic mail transmission processing in accordance with the flow chart of FIG. 14, as will be described later. Upon mail transmission by the electronic mail transmission processing executed by the indoor base station 9, the PDA 5 receives the transmitted electronic mail (step S44), and stores the received electronic mail in the storage medium 514, and displays the received electronic mail (step S45). The control section 507 then disconnects the communication channel from the indoor base station 9 and terminates electronic mail reception processing 3 (step S46).

(Electron Mail Transfer Processing Performed by Indoor Base Station 9)

The electronic mail transmission processing to be performed when the indoor base station 9 in FIG. 9 receives a mail transmission request from the PDA 5 incorporating the radio communication function will be described next with reference to the flow chart of FIG. 13. This transfer processing corresponds to the electronic mail transfer processing performed by the indoor base station 9 between steps S43 and S44 performed by the PDA 5, as shown in FIG. 14.

Figure 14:
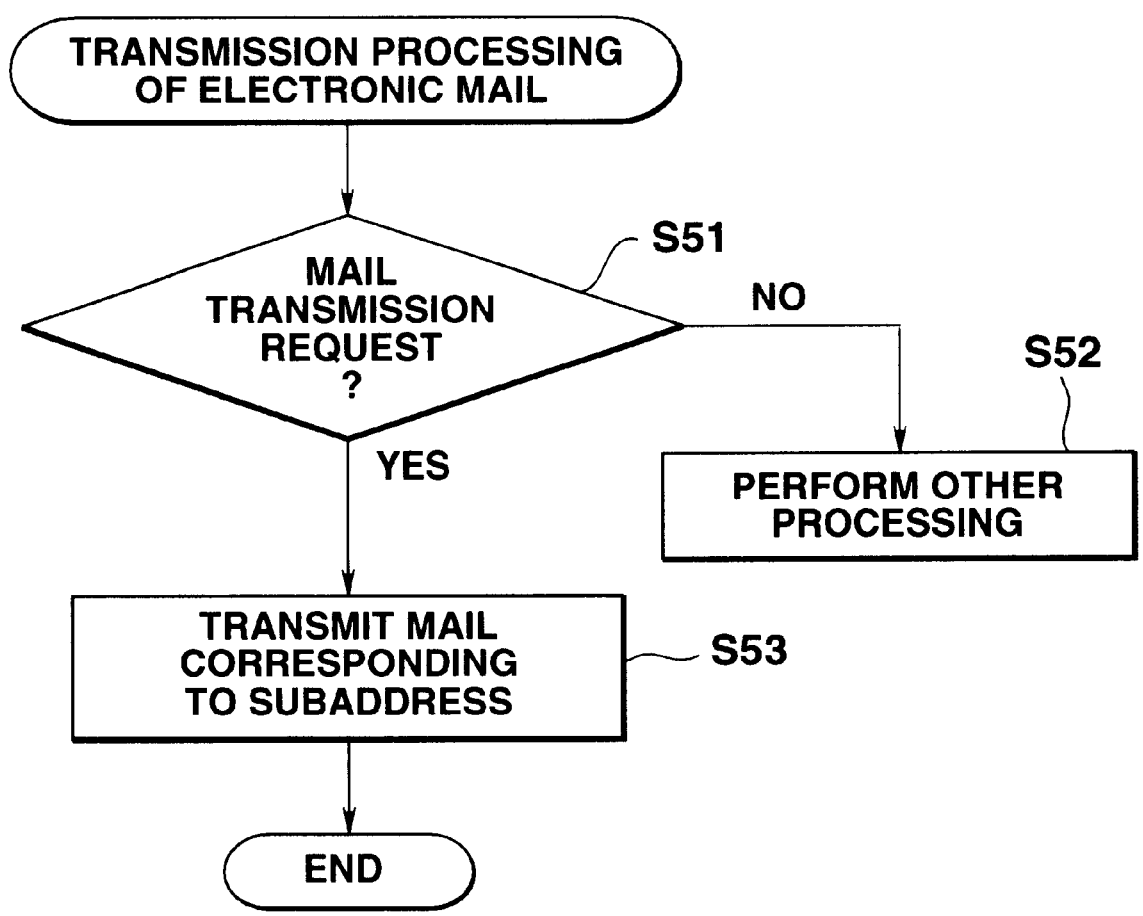
FIG. 14 is a flow chart showing the transmission. processing of an electric mail of the indoor base station of FIG. 9 in the third embodiment.

Referring to FIG. 14, the control section 907 of the indoor base station 9 detects whether a mail transmission request is received from each terminal or not (step S51). If a reception of a mail transmission is not detected, the control section 907 performs processing other than that associated with the electronic mail transfer processing (step S52).

If it is detected that a mail transmission request like the one in step S43 in the flow chart of FIG. 13 is received, the control section 907 of the indoor base station 9 connects a communication path to the mail server 3 and refers to the "terminal ability" set, in correspondence with each "subaddress", in the local mailbox 914a, shown in FIG. 11, set in the storage medium 914 in the storage unit 913 to determine the terminal as the transmission source of the mail transmission request. The control section 907 then transmits common (general) mail corresponding to the subaddress of the determined terminal and the mail address allocated to the account (step S53).

In the third embodiment, the PDA 5 incorporating the radio communication function and the radio communication unit 7 perform radio communication by using the indoor base station 9 as a master unit. However, when a mail transmission request is to be transmitted to the indoor base station 9, dial-up connection may be performed with respect to the telephone number set in the indoor base station 9.

According to the configuration described above, in the electronic mail system 10 of the third embodiment, the indoor base station 9 executes the electronic mail termination notification processing shown in FIG. 12, and accesses the corresponding mail box of the mail server 3 at a predetermined timing (predetermined time set by the user in advance, an electronic mail termination notification service, or the like). Upon determining the reception of a new mail, i.e., the presence of non-downloaded mail, the indoor base station 9 downloads the non-downloaded mail from the mail server 3, and refers to the header of the received mail to determine whether a subaddress identifier is added to the destination mail address of the received mail or not. If it is determined that a subaddress is added to the received mail, the received mail is stored in the corresponding memory area in the local mail box 914a. The indoor base station 9 then refers to the "terminal number" set in correspondence with each "subaddress" in the local mailbox 914a in FIG. 11 to determine whether the terminal corresponding to the subaddress indicating the destination of the received mail is ready for communication or not. If it is determined that the corresponding terminal is ready for communication, a mail termination notification is transmitted to the corresponding terminal.

Upon reception of the mail termination notification from the indoor base station 9, the communication terminal (the PDA 5 incorporating the radio communication function, the radio communication unit 7, the personal computer 6, or the like) transmits a transmission request for the electronic mail corresponding to the received mail termination notification to the indoor base station 9. In response to this transmission request, the indoor base station 9 executes electronic mail transfer processing (see FIG. 14) and refers to the "terminal ability" set in correspondence with each "subaddress" in the local mail box 914$a$, thereby transmitting the mail corresponding to the communication terminal. In response to mail transmission from the indoor base station 9, the communication terminal receives and stores the transmitted electronic mail.

In this configuration, pieces of electronic mail sent to one mail address corresponding to one account are collectively received by the indoor base station 9 and stored in the local mailbox 914$a$ in units of subaddress designated as destinations. Therefore, the terminals corresponding to the subaddress need not independently access the mail server 3. This can save the traffic, communication expenses, time, power consumed by the communication terminals, and the like in accessing the mail server 3.

In addition, the indoor base station 9 that has collectively received electronic mail from the mail server 3 can transmit a mail termination notification to each terminal, the user of each terminal can know the reception of electronic mail at any time. This can enhance the usefulness of the electronic mail service.

The present invention is not limited to the first to third embodiments and can be variously modified within the spirit and scope of the invention. For example, in the electronic mail communication systems 1 and 10 of the first to third embodiments of the present invention, the radio communication performed by the PDA 5 incorporating the radio communication function, the radio communication unit 7, and the like may be performed by a mobile communication scheme using a mobile telephone, portable telephone, PHS, or the like.

The first to third embodiments of the present invention have exemplified the electronic mail communication systems 1 and 10 designed to provide electronic mail services. However, the present invention can be applied to other mail services (voice mail, character mail for pagers, and the like).

In the third embodiment, the indoor base station 9 serves as a master unit for the PDA 5 incorporating the radio communication function and the radio communication unit 7 to perform radio communication. In contrast to this, a file server in a personal computer LAN (Local Area Network) may have the same function as that of the indoor base station 9 to connect a public network to the LAN through a gateway device, and mail notification processing may be performed for the terminal or personal computer connected to the LAN. That is, the file server having the same function as that of the indoor base station 9 may be an electronic mail communication system for receiving electronic mail having undergone communication protocol conversion and the like from the mail server 3 through the gateway device, and performing mail termination notification and mail transmission with respect to the PDA 5 incorporating the radio communication function, the radio telephone unit 7, and the PC 6 wired to the LAN on the basis of the local mail box 914$a$.

In the above LAN, the PCs 6 need not be connected to each other through wires. That is, the present invention can be applied to a so-called radio LAN in which PCs are connected to each other through radio waves, infrared rays, laser beams, or the like.

According to this configuration, the same effects as those of the third embodiment can be obtained in a personal computer LAN in an office or the like. When reception control is performed such that a reception condition and a subaddress can be set in each terminal as in the second embodiment, in particular, the user of each terminal can know the reception of electronic mail at any time even on the move. This can further enhance the usefulness of electronic mail services.

The configuration of the second embodiment, i.e., the configuration in which a reception condition is input to the storage medium 514 in advance, the reception condition is made to correspond to a subaddress, and reception control is performed by using the clocking function of the control section 507 and the base station information or area information based on position registration performed by the radio communication function, can be applied to the third embodiment.

As described in the first to third embodiments, there are provided an electronic mail communication apparatus, electronic mail system, electronic mail communication method, and electronic mail transmission method which can send electronic mail to a plurality of destinations, as needed, by adding respective subaddresses to the mail address allocated to one account.

What is claimed is:

1. An electronic mail communication apparatus comprising:
    address adding means for adding a mail address to an electronic mail;
    subaddress adding means for adding subaddress to the electronic mail to which the mail address has been added by said address adding means, the subaddress adding a new attribute to the electronic mail; and
    transmission means for transmitting the electronic mail to which the mail address and the subaddress have been added by said address adding means and subaddress adding means, respectively.

2. The electronic mail communication apparatus, according to claim 1, wherein said new attribute indicates one of a plurality of persons who commonly own the mail address which has been added to the electronic mail.

3. The electronic mail communication apparatus, according to claim 1, wherein said new attribute indicates whether the electronic mail is for business or private use.

4. The electronic mail communication apparatus, according to claim 1, wherein said new attribute indicates a terminal that is allowed to receive the electronic mail.

5. An electronic mail communication apparatus comprising:
    subaddress designating means for designating a subaddress to select an electronic mail to be received from among the electronic mails having a predetermined mail address, wherein the subaddress adds a new attribute to the electronic mail; and
    reception means for receiving the electronic mail having the predetermined mail address and the subaddress designated by said subaddress designating means.

6. The apparatus according to claim 5, further comprising second reception means for receiving an electronic mail which has the predetermined mail address but which does not have the subaddress designated by said subaddress designating means.

7. An apparatus according to claim 5, further comprising:
    reception condition storage means for storing reception conditions corresponding to the subaddress, and
    wherein said reception means comprises means for determining whether or not a subaddress of an electronic mail to be received meets the reception condition stored in said reception condition storage means, and means for receiving the electronic mail when said determining means determines that the subaddress meets the reception condition.

8. An electronic mail communication apparatus comprising:
   reception condition storage means for storing a reception condition corresponding to a subaddress added to an electronic mail, wherein the subaddress adds a new attribute to the electronic mail;
   means for determining whether or not a subaddress of an electronic mail to be received meets the reception condition stored in said reception condition storage means; and
   reception means for receiving the electronic mail to be received when said determining means determines that the subaddress thereof meets the reception condition.

9. The apparatus according to claim 8, further comprising second reception means for receiving the electronic mail to be received when said determining means determines that the subaddress thereof does not meet the reception condition, if the electronic mail to be received does have a predetermined mail address.

10. An electronic mail communication apparatus comprising:
    reception means for receiving an electronic mail having a mail address and a subaddress which adds a new attribute to the electronic mail;
    terminal information storage means for storing terminal information indicating a correspondence between each of a plurality of terminals and each of a plurality of subaddresses; and
    notification means for determining which of the plurality of terminals is allowed to receive the electronic mail received by said reception means based on the terminal information, and for informing the determined terminal of reception of the electronic mail.

11. An electronic mail communication system comprising:
    a base station; and
    a plurality of electronic mail communication apparatuses,
    wherein said base station comprises:
       reception means for receiving an electronic mail having a mail address and a subaddress which adds a new attribute to the electronic mail;
       storage means for storing apparatus information indicating a correspondence between each of said electronic mail communication apparatuses and each of a plurality of subaddresses; and
       transmission means for transmitting the electronic mail received by said reception means to one of the mail communication apparatuses which is determined to be allowed to receive the electronic mail received by said reception means based on the apparatus information.

12. An electronic mail communication system comprising:
    a mail server for managing electronic mails based on mail addresses allocated to accounts; and
    an electronic mail communication apparatus communicated with said mail server,
    wherein said mail server comprises:
       reception means for receiving an electronic mail having a mail address and a subaddress which adds a new attribute to the electronic mail; and
       storage means for classifying the electronic mail received by said reception means based on the subaddress.

13. The apparatus according to claim 12, wherein said mail server further comprises:
    second storage means for storing apparatus information indicating a correspondence between each of a plurality of electronic mail communication apparatuses and each of a plurality of subaddresses; and
    transmission means for transmitting the electronic mail received by said reception means to at least one of the mail communication apparatuses which is determined to be allowed to receive the electronic mail received said reception means based on the apparatus information.

14. An electronic mail communication system comprising:
    a mail server for managing electronic mails based on mail addresses allocated to accounts; and
    an electronic mail communication apparatus,
    wherein said electronic mail communication apparatus comprises:
       address adding means for adding a mail address to an electronic mail;
       subaddress adding means for adding a subaddress to the electronic mail to which the mail address has been added by said address adding means, the subaddress adding a new attribute to the electronic mail; and
       transmission means of transmitting the electronic mail to which the mail address and the subaddress have been added by said address adding means and said subaddress adding means, respectively; and
    wherein said mail server comprises:
       reception means for receiving an electronic mail having a mail address and a subaddress; and
       storage means for storing the electronic mail received by said reception means based on the mail address and the subaddress thereof.

15. An electronic mail communication system comprising:
    a mail server for managing electronic mails; and
    a plurality of communication terminals which are connected to said mail server,
    wherein said mail server comprises:
       reception means for receiving an electronic mail having a mail address and a subaddress which adds a new attribute to the electronic mail; and
       storage means for storing the electronic mail received by said reception means based on the mail address and the subaddress.

16. The system according to claim 15, wherein said mail server further comprises:
    second storage means for storing terminal information indicating a correspondence between each of the plurality of communication terminals and each of a plurality of subaddresses; and
    transmission means for transmitting the electronic mail received by said reception means to at least one of the communication terminals which is determined to be allowed to receive the electronic mail received said reception means based on the terminal information stored in said second storage means.

17. An electronic mail communication apparatus which transits/receives data to/from a base station including position registration means for detecting and registering a location of the electronic mail communication apparatus, the apparatus comprising:

storage means for storing a positional condition indicating a correspondence between the location of the electronic mail communication apparatus and a subaddress of an electronic mail, wherein the subaddress adds a new attribute to the electronic mail;

means for determining whether or not a subaddress of an electronic mail to be received meets the positional condition stored in said storage means; and reception means for receiving the electronic mail to be received when said determining means determines that the subaddress thereof meets the positional condition.

18. An electronic mail communication method in an electronic mail system, said method comprising:

adding a mail address to an electronic mail;

adding a subaddress to the electronic mail to which the mail address has been added, the subaddress adding a new attribute to the electronic mail; and transmitting the electronic mail to which each of the mail address and the subaddress have been added.

19. An electronic mail communication method in an electronic mail system, said method comprising:

designating a subaddress to select an electronic mail to be received from among electronic mails having a predetermined mail address, wherein the subaddress adds a new attribute to the electronic mail; and receiving the electronic mail having the predetermined mail address and the designated subaddress.

20. A memory medium having stored thereon computer-readable program codes for causing a computer to:

add a mail address to an electronic mail;

add a subaddress to the electronic mail to which the mail address has been added, the subaddress adding a new attribute to the electronic mail; and transmit the electronic mail to which each of the mail address and the subaddress have been added.

21. A memory medium having stored thereon computer-readable program codes for causing a computer to:

designating a subaddress to select an electronic mail to be received from among electronic mails having a predetermined mail address, wherein the subaddress adds a new attribute to the electronic mail; and receiving the electronic mail having the predetermined mail address and the designated subaddress.

* * * * *